US011900552B2

(12) United States Patent
George

(10) Patent No.: US 11,900,552 B2
(45) Date of Patent: Feb. 13, 2024

(54) SYSTEM AND METHOD FOR GENERATING VIRTUAL PSEUDO 3D OUTPUTS FROM IMAGES

(71) Applicant: PerfectFit Systems Private Limited, Cochin (IN)

(72) Inventor: Eobin Alex George, Cochin (IN)

(*) Notice: Subject to any disclaimer, the term of this patent is extended or adjusted under 35 U.S.C. 154(b) by 7 days.

(21) Appl. No.: 17/705,309

(22) Filed: Mar. 26, 2022

(65) Prior Publication Data

US 2023/0052169 A1 Feb. 16, 2023

(30) Foreign Application Priority Data

Aug. 16, 2021 (IN) .............................. 202141037110

(51) Int. Cl.
| | |
|---|---|
| *G06T 19/00* | (2011.01) |
| *G06T 7/194* | (2017.01) |
| *G06T 7/73* | (2017.01) |
| *G06T 15/04* | (2011.01) |
| *G06T 17/00* | (2006.01) |

(52) U.S. Cl.
CPC ............ *G06T 19/006* (2013.01); *G06T 7/194* (2017.01); *G06T 7/74* (2017.01); *G06T 15/04* (2013.01); *G06T 17/00* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 2015/0302665 A1* | 10/2015 | Miller | ................ G02B 27/0093 345/419 |
| 2021/0118216 A1* | 4/2021 | Komissarov | ............ G06T 17/00 |
| 2021/0279957 A1* | 9/2021 | Eder | ........................ G06N 3/08 |

\* cited by examiner

*Primary Examiner* — Michael J Cobb

(57) ABSTRACT

A method for generating virtual pseudo three dimensional 360 degree outputs from 2D images of an object 102 is provided. An image viewer plane of the object 102 in the 3D image to be rendered on a user device 108 is detected using an augmented reality technique. An image viewer plane is placed facing the user device 108 rendering 'Image 0' and movement coordinates of the user device 108 with respect to the image viewer plane is detected to calculate the virtual pseudo 3D image set to be displayed based on at least one angle of view by performing interpolation between two consecutive virtual pseudo 3D images. The image viewer plane is changed with respect to the movement of the user device 108 to change the virtual pseudo 3D image and the interpolated virtual pseudo 3D image on the plane and that image is displayed as an augmented reality object in real-time to the user device 108.

11 Claims, 17 Drawing Sheets

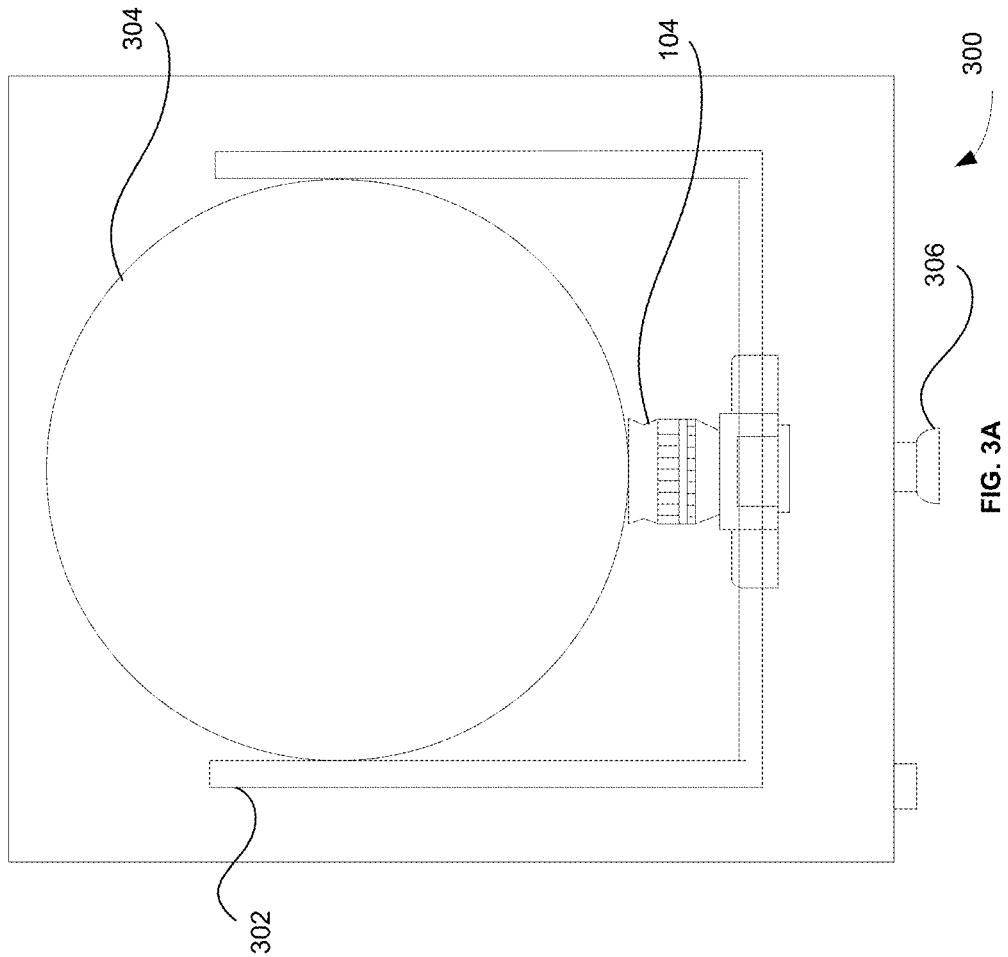

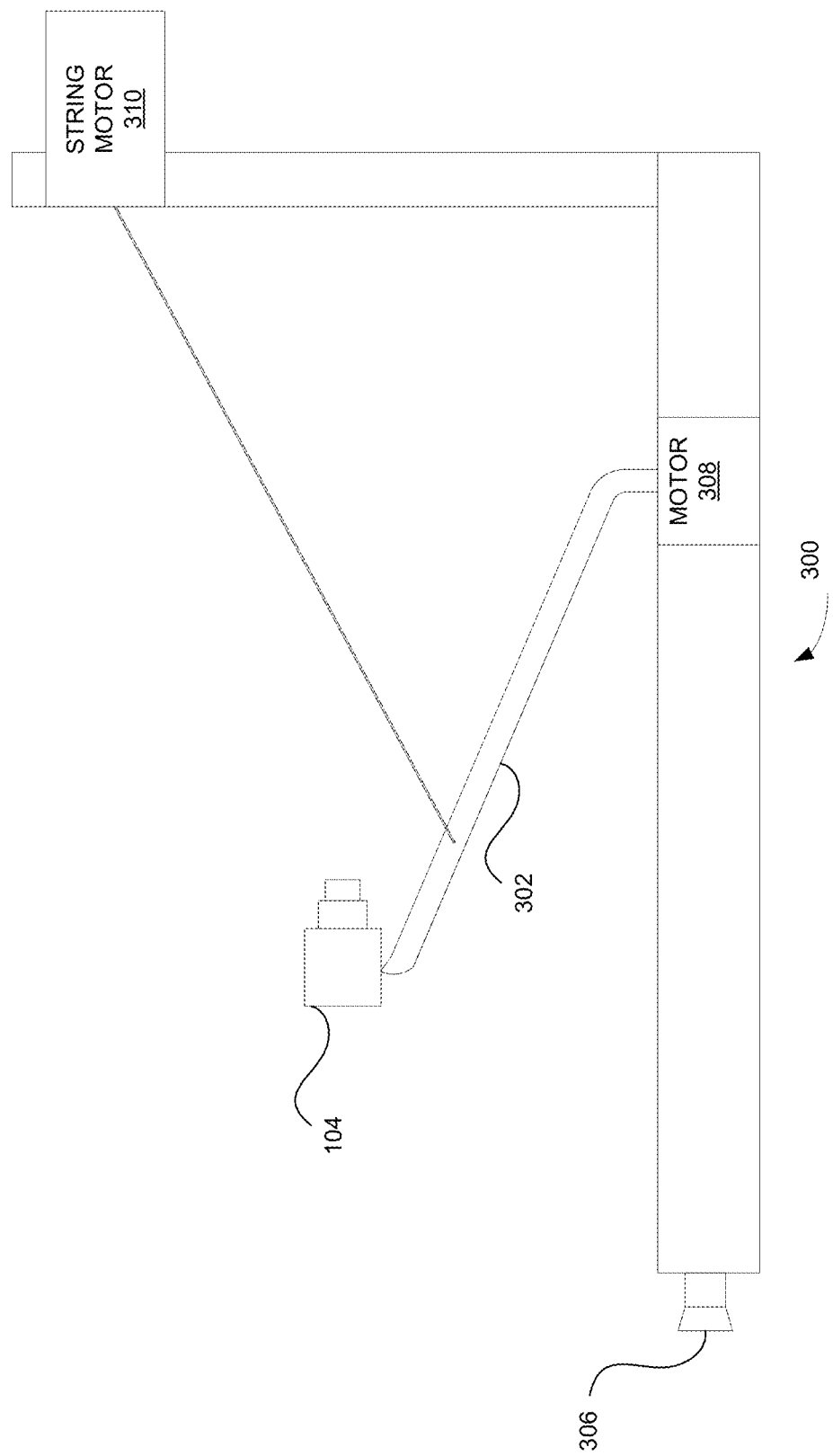

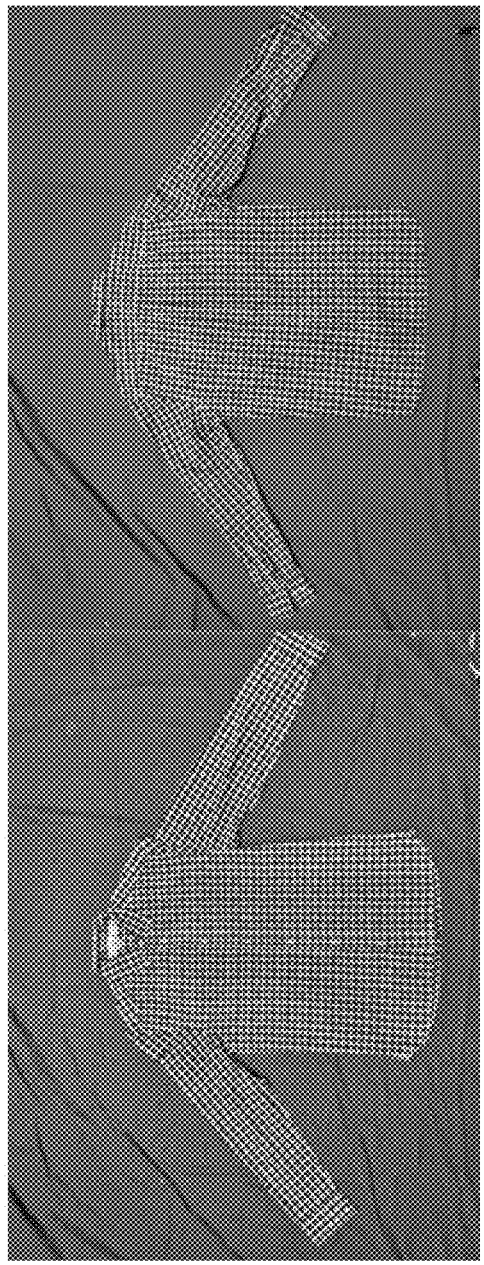
FIG. 4A
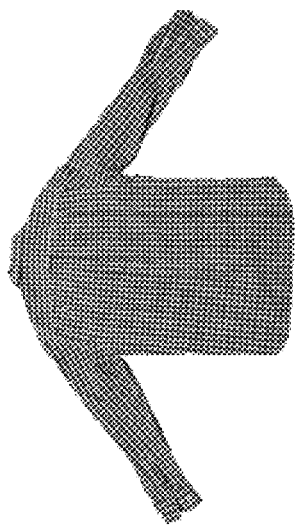
FIG. 4B
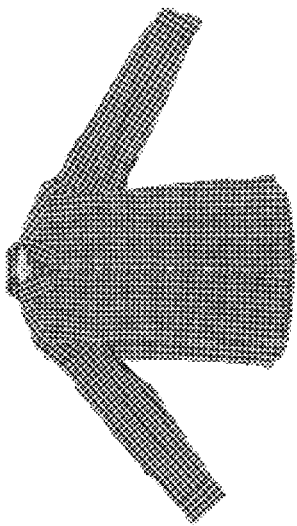

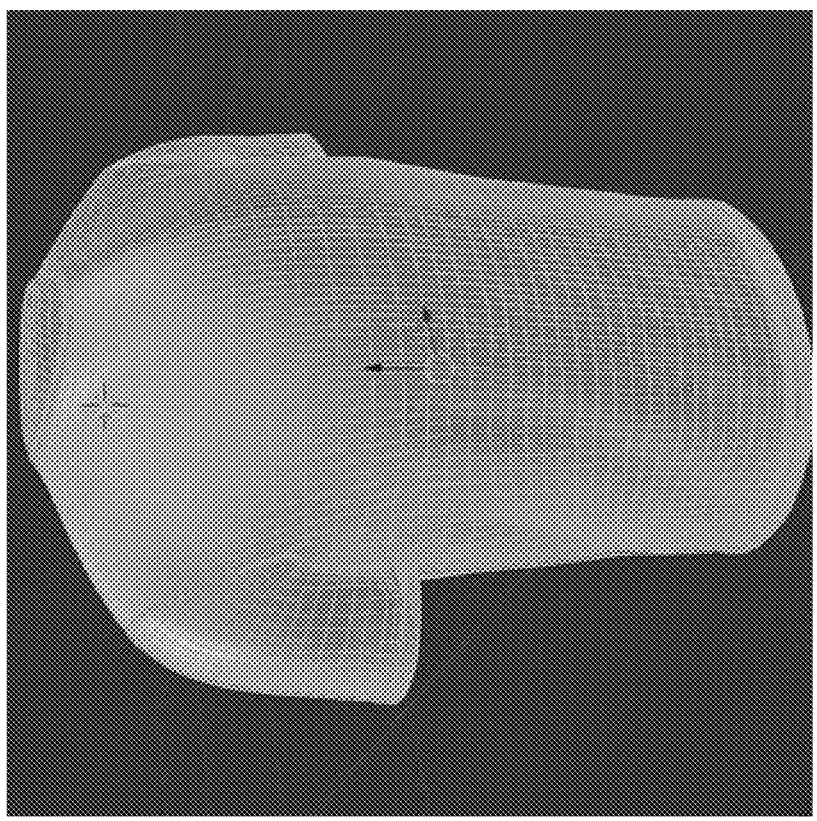
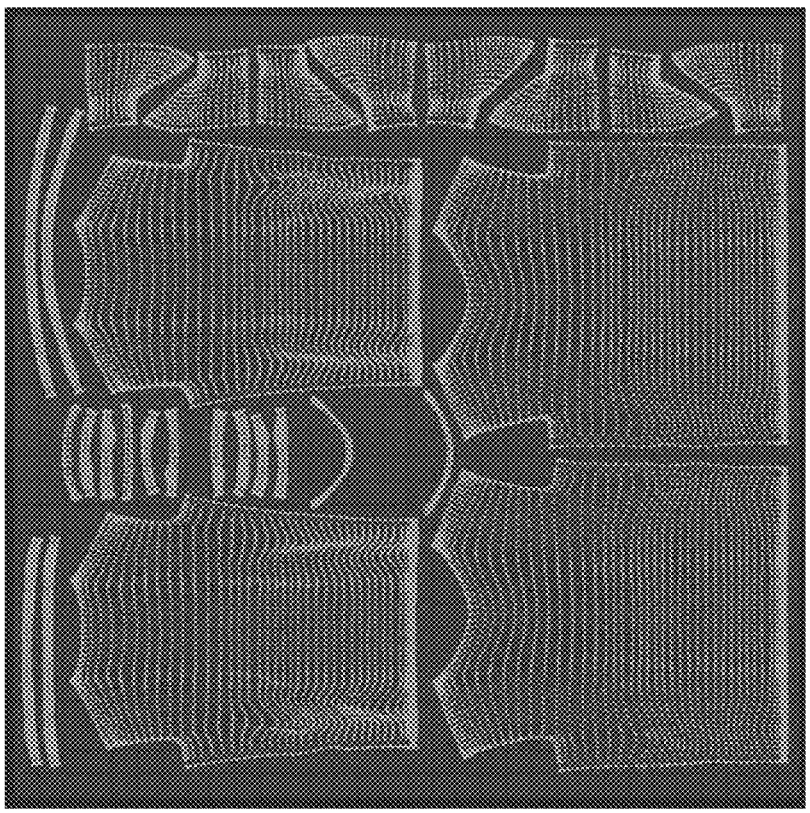
FIG. 5A

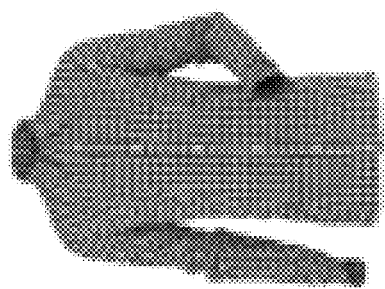
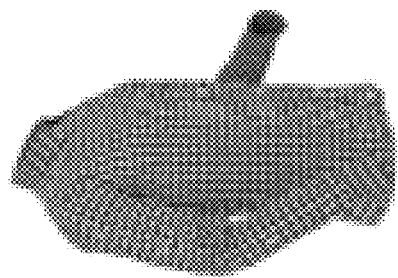
FIG. 5B

SYSTEM AND METHOD FOR GENERATING VIRTUAL PSEUDO 3D OUTPUTS FROM IMAGES

BACKGROUND

Technical Field

The embodiments herein generally relate to image processing, more particularly to a system and a method for generating virtual pseudo three dimensional 360 degree outputs from an image input using machine learning and image processing.

Description of the Related Art

With an advent of e-commerce, it has become more and more important to match the digital world with the real world when it comes to product presentation. Most times, people have no choice than to go to the shop or the market only to check the fitting, fabric, and comfort when it comes to buying clothes.

Buying from shops, malls and local markets comes with its own cost. The buyer has to locate a right shop to buy what they need. The shop or the mall might be out of stock. The buyer has to travel and spend resources to buy what they need. The buyers may have choices limited by the general demand at the local shops. The shops and malls need to store up things and need big warehouses. Also, there is general inefficiency in current system when it comes to managing the supply and demand.

There have been attempts to digitalize a product by clicking multiple two dimensional swatch images of the product and the model and rendering the product on the model in three dimensional view. But the current process needs more image data and takes longer time to generate the three dimensional rendering of the product. This technique has limitation in terms of time, cost, and quality. The other method is to take on model shoots which is not scalable nor is it cost effective for large product counts. The digitalized three dimensional rendering may not give the real feel and fit of the model. Also, the process requires considerable human input which makes it expense.

Accordingly, there remains a need for a system and method for generating a digitalized three-dimensional product more effectively and in scale.

SUMMARY

In view of the foregoing, an embodiment herein provides a system for generating a real-time virtual pseudo 3-dimensional (3D) augmented reality image of an object from a 2-dimensional (2D) image of the object. The system includes a processor. The processor processes at least one 2-dimensional (2D) image of an object, using a trained machine learning model, to eliminate the background of the object and segment the object from the at least one 2D image. The at least one 2D image is captured using a camera or an image capturing device from multiple angles to wrap a 3D model. The processor generates a pseudo 3D 360 degree image set of the object by overlaying a 3D model on to another 3D model. The processor generates a set of consecutive pseudo 3D 360 degree image set of the object covering 360 degree or 360 degree in 3D of the object from at least one of the 3D object/object combinations or the pseudo 3D 360 degree image set of the object. Alternatively, the processed images of the object are captured from 360 degree or 360 degree in 3D is used to generate a set of pseudo 3D 360 degree image sets of the object. The missing frames in the pseudo 3D 360 degree image sets through created through either of these above steps are generated frame interpolation between existing frames for a smoother transition through standard frame interpolation techniques like event-based video frame interpolation or frame based techniques. The pseudo 3D 360 degree image sets can be combined with similarly generated pseudo 3D 360 degree image sets to generate a combination pseudo 3D 360 degree image sets of the objects. The processor detects a plane of the object in the pseudo 3D image of the object or the pseudo 3D 360 degree image set of the object to be rendered on a user device (108) using augmented reality techniques or feature point motion or an optic flow. The processor first defines a frame of reference of the user's device and the camera view of the real world using augmented reality techniques, IMU data or user input or the feature point detection and their motion/change. This frame of reference is then used to align the frame of reference of the object's pseudo 3D 360 degree image set using machine learning trained data or a first user input. The processor loads an angle 0 image at initial orientation and loads corresponding images from the pseudo 3D 360 degree image set/interpolated data/real-time 3D rendered data of the 3D object or combinations (i) while the user device changes orientation or (ii) by a user command. The processor generates realistic visualization using colour correction from meta-data of the pseudo 3D image form at least one of a camera, real world readings from an image capturing device, a machine learning unit to detect the settings or a second user input. The processor creates a frame of reference for arranging the pseudo 3D 360 degree image geometrically based on feature point motion and orientation change in consecutive frame sets both during capture and during render output to combine 2 or more sets of pseudo 3D 360 degree image sets by scaling, skewing and rotation and then aligns them based on feature alignment, pre-sets or user inputs to generate an output pseudo 3D 360 degree image set that is compatible with augmented reality. The processor generates a virtual pseudo 3D 360 degree image set of the object to be displayed based on at least one angle of view by detecting movement coordinates of the user device with respect to the pseudo 3D 360 degree image set's viewer plane. The pseudo 3D 360 degree image set can be rendered as single proprietary format as well.

In an embodiment, the processor modifies a perspective of the image viewer plane to change the virtual pseudo 3D 360 degree image of the object on the image viewer plane by performing an interpolation between at least two consecutive virtual pseudo 3D 360 degree images sets according to the movement coordinates of the user device in real time. The processor provides the virtual pseudo 3D 360 image set of the object on the image viewer plane as an augmented reality object in real-time on the user device, wherein the augmented reality object is overlayed on a camera feed of the user device as an interactive object or element.

In an embodiment, the at least one 2-dimensional (2D) image of the object is captured using an image capturing device from a first angle. The image capturing device is communicatively connected to the system. The image capturing device captures the at least one 2D image covering 360 degrees view of the object at various angles.

In another embodiment, the system generates the pseudo 3D 360 degree image set of the object by (i) identifying at least one key feature of the object using the trained machine learning model or a rule based point detection, (ii) identifies a closest matching 3D model of the object through object detection using the machine learning model or a third user input, wherein the third input comprises information for identifying a matching 3D model, (iii) extracts an unwrap of the 3D object for a flat layout of the object's surface, (iv) aligns the image of the object on a stencil or a mask using the unwrap of the 3D object using a fourth user input or skew, translation and rotation based on position on features identified and the position of corresponding feature in the mask or by corner/edge detection, (v) wraps the image of the object (102) on the 3D model using the at least one key feature identified, and (vi) overlays the 3D model on to the another 3D model.

In yet another embodiment, the system places the image viewer plane that faces the user device rendering the pseudo 3D 360 degree image of the object. The system detects the movement coordinates of the user device with respect to the image viewer plane using at least one of a change in a camera plane or an inertial measurement unit (IMU) input.

In yet another embodiment, the object includes a product of interest to a user in a physical retail store environment, a digital retail store environment, a virtual reality store environment, a social media environment or a web page environment.

In yet another embodiment, the image capturing device captures the at least one 2D image or a complete 3D 360 degree image or the pseudo 3D 360 degree image set covering 360 degrees view of the object at various angles.

In yet another embodiment, the user device includes a camera that implements a real-time consistent plane detection technique to display the pseudo 3D 360 degree image set of the object in augmented reality.

In yet another embodiment, the system determines coordinates of the object plane with respect to the user device at the 3D or 2D image of the object.

In yet another embodiment, the system determines coordinates of the 3D object plane with respect to the user device at the 3D or 2D image of the object.

In yet another embodiment, the system determines coordinates of the object's pseudo 3D 360 degree image set plane with respect to the user device at the 3D or 2D image of the object.

In yet another embodiment, the system displays subsequent virtual pseudo 3D 360 degree image set of the object with respect to a change of angle in 3D of the user device from the pseudo 3D 360 image set of the object.

In yet another embodiment, the machine learning model employs a machine learning technique that is designed to recognize and interpret training data through at least one of a machine perception, a labelling and clustering raw data. The machine learning model is trained to interpret the raw data by providing a collection of data as an input.

In yet another embodiment, the machine learning model is trained using one or more parameters of the object taken at one or more instances. The parameters include at least one of a colour and a texture of the object, key metric dimensions of the object including size information, formal or informal styles if the object is an item of clothing, a nature and, a category of the object and textual, brand, nature region of interest or iconographic data.

In one aspect, there is provided a method for generating a real-time virtual pseudo 3-dimensional (3D) augmented reality image of an object from a 2-dimensional (2D) image of the object. The method includes (i) processing, using a processor of an augmented reality display system, at least one 2-dimensional (2D) image of an object, using a trained machine learning model, to eliminate the background of the object and segment the object from the at least one 2D image, wherein the at least one 2D image is captured using a camera or an image capturing device from multiple angles to wrap a 3D model; (ii) identifying, using the processor, at least one key feature of the object using the trained machine learning model or a rule based point detection; (iii) identifying, using the processor, a closest matching 3D model of the object through object detection using the machine learning model or a first user input; (iv) extracting, using the processor, an unwrap of the 3D object for a flat layout of the object's surface; (v) aligning, using the processor, the image of the object on a stencil or a mask using the unwrap of the 3D object using a second user input or position on features identified and the position of corresponding feature in the mask; (vi) wrapping, using the processor, the image of the object on the 3D model using the at least one key feature identified; (vii) overlaying, using the processor, the 3D model on to another 3D model to generate a pseudo 3D 360 degree image set of the object; (viii) generating, using the processor, a set of consecutive pseudo 3D 360 degree image set of the object covering 360 degree or 360 degree in 3D of the object from at least one of the pseudo 3D image or the pseudo 3D 360 degree image set of the object; (ix) detecting, using the processor, a plane of the object in the pseudo 3D image of the object or the pseudo 3D 360 degree image set of the object to be rendered on a user device using augmented reality techniques (like RANSAC, superplane etc.) or feature point motion; (x) aligning, using the processor, a frame of reference of the user's device and that of the object's pseudo 3D 360 degree image set using real world machine learning trained data or a third user input; (xi) loading, using the processor, an angle 0 image at initial orientation; (xii) loading, using the processor, corresponding images from the pseudo 3D 360 degree image set/interpolated data/real-time 3D rendered data of the 3D object or combinations (a) while the user device changes orientation or (b) by a user command; (xiii) generating, using the processor, realistic visualization using colour correction from meta-data of the pseudo 3D image form at least one of a camera, real world readings from an image capturing device, a machine learning unit to detect the settings or a fourth user input; (xiv) creating, using the processor, a frame of reference for arranging the pseudo 3D 360 degree image geometrically based on feature point motion and orientation change in consecutive frame sets to combine 2 or more sets of pseudo 3D 360 degree image sets by scaling, skewing and rotation and then aligning them based on feature alignment, pre-sets or user inputs to generate an output pseudo 3D 360 degree image set that is compatible with augmented reality; and (xv) generating, using the processor, a virtual pseudo 3D 360 degree image set of the object to be displayed based on at least one angle of view by detecting movement coordinates of the user device with respect to the pseudo 3D 360 degree image set's viewer plane.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3A is an exemplary view of an image capturing system 300 to capture a real-time 2D image in various angle of FIG. 1 according to an embodiment herein;

FIG. 3B is an exemplary view of an image capturing system 300 to capture a real-time 2D image in X-axis and Y-axis of FIG. 3A according to an embodiment herein;

FIG. 4A is an exemplary view of capturing the real time 2D image in a fixed background of FIG. 3A according to an embodiment herein;

FIG. 4B is an exemplary view of eliminating the fixed background of the real time 2D image of FIG. 4A according to an embodiment herein;

FIGS. 5A-5B is an exemplary view of wrapping and conversion of the real time 2D image into a 3D object of FIG. 2 according to an embodiment herein;

DETAILED DESCRIPTION OF PREFERRED EMBODIMENTS

Figure 1:
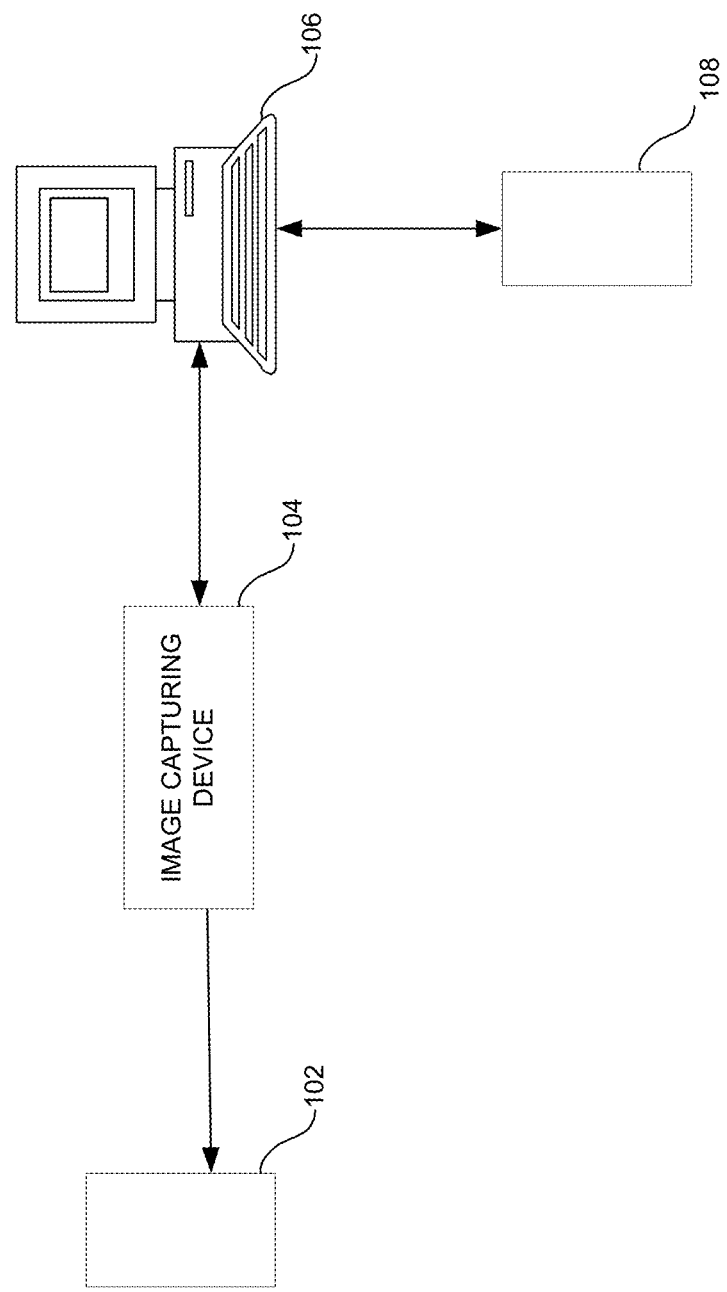
FIG. 1 illustrates a system view of a real-time 2D to virtual pseudo 3D conversion and augmented reality display system for generating a real-time 3D augmented reality display according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and a method for generating three dimensional 360 degree outputs and augmented display of the outputs from a single image input in real-time using machine learning models and image processing techniques. Various embodiments disclosed herein provide a system and a method for generating a real-time virtual pseudo three-dimensional (3D) augmented reality (AR) display from a two-dimensional (2D) image or image set using machine learning models and image processing techniques. Referring now to the drawings, and more particularly to FIGS. 1 through 10, where similar reference characters denote corresponding features consistently throughout the figures, preferred embodiments are shown.

FIG. 1 illustrates a system view of a real-time 2D to virtual pseudo 3D conversion and augmented reality display system for generating a real-time virtual pseudo 3D augmented reality display from a 2D image of an object according to an embodiment herein. The system view includes an image capturing device 104, and the real-time 2D to virtual pseudo 3D conversion and augmented reality display system 106. The image capturing device 104 captures at least one 2D image of an object 102 from multiple angles. The image capturing device can also be replaced with a 3D camera based on lidar, stereo-scopic capture device or laser to generate 3D scans by enabling it to be effectively and efficiently moved around the object in 3D 360 degree in cases where 3D data capture is affordable both computationally and economically. The real-time 2D to virtual pseudo 3D conversion and augmented reality display system 106 is communicatively connected to the image capturing device 104. The real-time 2D to virtual pseudo 3D conversion and augmented reality display system 106 provides a real-time 3D augmented reality display from a 2D image to a user. In some embodiments, the real-time 2D to virtual pseudo 3D conversion and augmented reality display system 106 may be a mobile phone, a kindle, a PDA (Personal Digital Assistant), a tablet, a music player, a computer, an electronic notebook, or a smartphone. The real-time 2D to virtual pseudo 3D conversion and augmented reality display system 106 includes a memory and a processor. The real-time 2D to virtual pseudo 3D conversion and augmented reality display system 106 generates a database of at least one 2D image of the object 102. In an embodiment, the object 102 may include any product of interest to the user in a physical retail store environment, a digital retail store environment, a virtual reality store environment, a social media environment or a web page environment. The 2D images covering 360 degrees view of the object 102 at various angles are captured using the image capturing device 104. In some embodiments, the image capturing device 104 may be a robotic camera device. The real-time 2D to virtual pseudo 3D conversion and augmented reality display system 106 processes the 2D images using a trained machine learning model to eliminate the background and segment the object 102 from the 2D images. The real-time 2D to virtual pseudo 3D conversion and augmented reality display system 106 renders the at least one 2D image of the object 102 captured from the multiple angles for generating a pseudo 3D model based on pseudo 3D 360 degree image set/data generated for the object 102 to be displayed based on at least one angle of view of a user device 108. The real-time 2D to virtual pseudo 3D conversion and augmented reality display system 106 processes at least one key feature of the object 102 for accurate alignment and for generating asset combination by overlaying the pseudo 3D model on to another pseudo 3D model. The real-time 2D to virtual pseudo 3D conversion and augmented reality display system 106 identifies at least one key feature of the object 102 using the trained machine learning model to align the object 102 on a stencil/mask used for wrapping the image/texture of the object 102 on a pseudo 3D model. The real-time 2D to virtual pseudo 3D conversion and augmented reality display system 106 generates a set of consecutive pseudo 3D 360 degree image set of the object 102 covering 360 degrees degree or 360 degree in 3D of the object 102 from at least one of the pseudo 3D image or the pseudo 3D 360 degree image set of the object 102. The real-time 2D to virtual pseudo 3D conversion and augmented reality display system 106 performs bidimensional/UV unwrapping of the 3D model and places the flat layout of the object 102 on the UV unwrap of the 3D model and wrap the UV on the 3D model and generates a 2D image set of the 3D model (i.e. pseudo 3D 360 degree image set) or a 3D object which is wrapped with object's skin or its render. In another method, the set of 2D images along with their respective orientation information is stored in a list called the image-lookup list. These images are directly used without the use of 3D models or bidimensional/UV-unwrapping to generate visualizations of an object from various view angles as in FIG. 7C. The real-time 2D to virtual pseudo 3D conversion and augmented reality display system 106 detects a plane of the object 102 in the pseudo 3D structure/image/the pseudo 3D 360 degree image set of the object (102) and/or in a user device 108 and renders the 2D image or the set of the 2D image or the interpolated image frame (for smoother transition or missing image 'from angles) on the user device 108 via standard augmented reality techniques or consistent plane detection algorithms. The real-time 2D to virtual pseudo 3D conversion and augmented reality display system 106 places an image viewer plane facing the user device 108 rendering 'Image 0'. For augmented reality use cases where the pseudo 3D 360 degree image is displayed in a real-world video feed using the user's device, an additional plane is detected in the environment using the user's device which can be interacted with or processed by frame progression or switching. The user device includes a camera using various Real-time consistent plane detection algorithms to display the pseudo 3D 360 degree image of the object in Augmented reality. The coordinates of the object plane with respect to the user device 108 are determined at the 'Image 0'. The real-time 2D to virtual pseudo 3D conversion and augmented reality display system 106 detects movement coordinates of the user device 108 using a combination of camera plane change as well as though IMU inputs for effective tracking with respect to the image viewer plane to calculate the pseudo 3D 360 degree image to be displayed based on at least one angle of view by performing interpolation between at least two consecutive virtual pseudo 3D 360 degree images according to the movement coordinates of the user device 108 in real time, considering the image viewer plane is at the user device 108. The real-time 2D to virtual pseudo 3D conversion and augmented reality display system 106 changes the perspective of the image viewer plane to change the virtual pseudo 3D 360 degree image on the image viewer plane based on interpolation and provides the virtual pseudo 3D 360 degree image on the plane as an augmented reality object (i.e. output) in real-time to the user device 108. The augmented reality object is overlayed on a camera feed of the user device 108. The real time interpolation enables the user to experience seamless three dimensional viewing without using a lot of bandwidth or processing load on user device or streaming services in real-time. At any point in time, the real time interpolation provides the virtual pseudo 3D 360 degree image which matches the true 3D image viewed from the at least one angle of view. When the user device 108 is moved or rotated, the movement coordinates are detected and correlated to the 'image 0'. The subsequent virtual pseudo 3D 360 degree images (image 1 to image N) are displayed with respect to a change of angle in three dimension of the user device 108 from the 'image zero'. The same system can be used in conjunction with a 3D object which is generated using photogrammetry of the set of 2D images mentioned earlier as well.

In an embodiment, the machine learning model is a machine learning technique that is designed to recognize and interpret the data through a machine perception, a labelling and by clustering the raw data. The machine learning model is trained to interpret the raw data by providing a collection of data as an input. The neural networking model is trained to perform the task with the processor. The machine learning model may be trained using various parameters of the object 102 taken at one or more instances to create a realistic output. The parameters include at least one of a colour and a texture of the object, key metric dimensions of the object including size information, formal/informal styles if the object is an item of clothing, a nature and, a category of object. It can also be used to extract textual information for generating product description, read prices and details of product use and specification of weight and/or nutritional facts. The examples of the category are an item of clothing, wearables, window display of artwork, fresh food items, packaged food, consumables, car, sports item, luxury items, a body of a human or an animal, a model of real places (indoor/outdoor) etc. In an embodiment, the real-time 2D to virtual pseudo 3D conversion and augmented reality display system comprises a motor to tilt (e.g. up, down, left or right) the image capture device or the camera.

Figure 2:
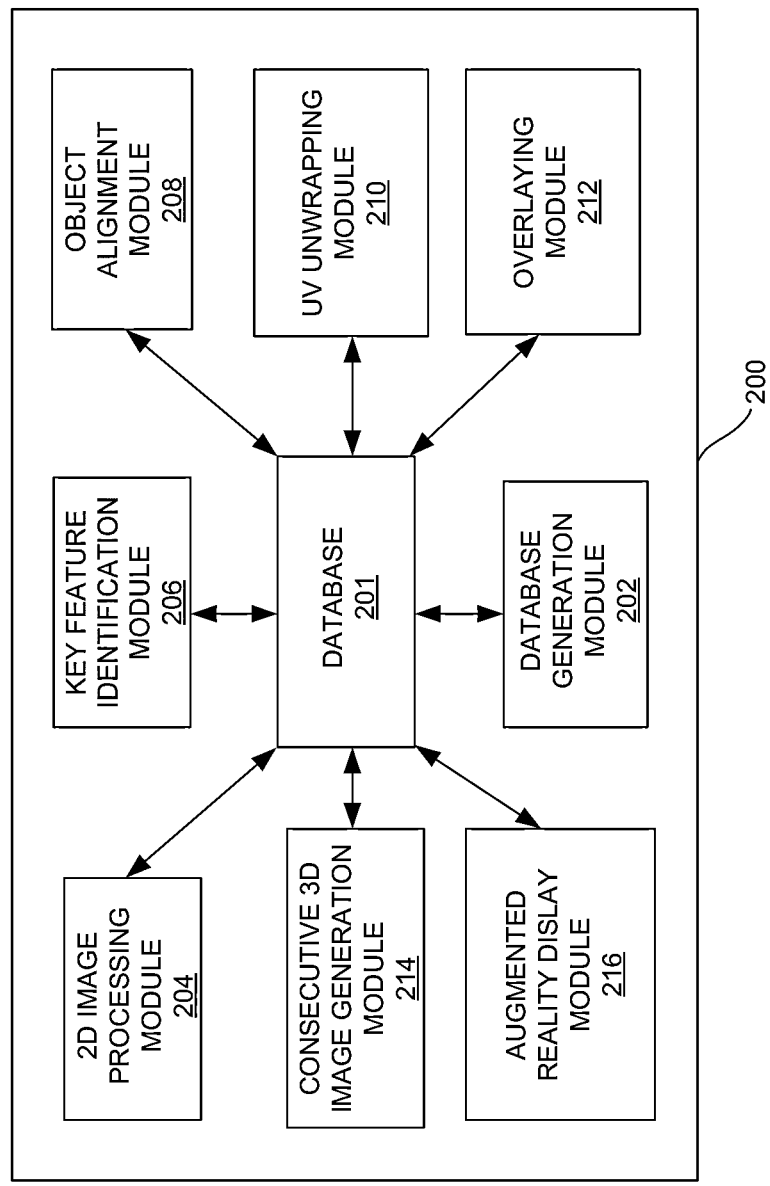
FIG. 2 is an exploded view of the real-time 2D to virtual pseudo 3D conversation and augmented reality display system of FIG. 1 according to an embodiment herein.

FIG. 2 is an exploded view of the real-time 2D to virtual pseudo 3D conversion and augmented reality display system 106 of FIG. 1 according to an embodiment herein. The real-time 2D to virtual pseudo 3D conversion and augmented reality display system 106 includes a database 201, a database generation module 202, a 2D image processing module 204, a key feature identification module 206, an object alignment module 208, a UV unwrapping module 210, an overlaying module 212, and an augmented reality display module 214. 2D images covering 360 degrees view of the object 102 are obtained/captured at various angle of view using an image capturing device 104. The 2D images may be stored in the database 201 of a memory. The database generation module 202 generates the database 201 with the 2D images of the object 102. In an embodiment, the object 102 may include any product of interest to the user in a physical retail store environment, a digital retail store environment, a virtual reality store environment, a social media environment or a web page environment. The 2D image processing module 204 processes the 2D images using a trained machine learning model to eliminate the background and segment the object 102 from the 2D images. The key feature identification module 206 identifies at least one key feature of the object 102 using the trained machine learning model. The object alignment module 208 aligns the object 102 on a stencil/mask used for wrapping the image/texture of the object 102 on a pseudo 3D model. The UV unwrapping module 210 performs UV unwrapping of the pseudo 3D model and places the flat layout of the object 102 on the UV unwrap of the pseudo 3D model. The pseudo 3D model may be selected based on the closest 3D model based on the detection of the object that is being scanned in the unit. In case the pseudo 3D model is not available, the closest model is modified, manually made, or is generated through techniques like morphing or photogrammetry. The overlaying module 212 overlays the pseudo 3D model on to another pseudo 3D model to generate a new pseudo 3D 360 degree image set or 3D object or 2D images. The augmented reality display module 216 is configured to perform (i) detecting a plane of the object 102 in the pseudo 3D 360 degree image set or 3D structure to be rendered on a user device 108 as well as the plane of reference of the user device as well either through visual modes like Real-time consistent plane detection algorithms or via an augmented reality technique pr using a combination of visual methods with the user device Inertial IMU sensors, compass and other sensors; (ii) placing an image viewer plane facing the user device 104 rendering "Image 0"; (iii) detecting the movement coordinates of the user device 108 with respect to the plane to calculate the virtual pseudo 3D 360 degree image to be displayed based on at least one angle of view by performing interpolation between two consecutive virtual pseudo 3D 360 degree images or interpolated data; (iv) changing the perspective of the plane to change the virtual pseudo 3D 360 degree image on the plane based on the interpolation or image modification through but not limited to skew, scale and wrapping; and (v) providing the virtual pseudo 3D 360 degree image set on the plane as an augmented reality object in real-time to the user device 108.

FIG. 3A is an exemplary view of an image capturing system 300 to capture a real-time 2D image in various angle of FIG. 1 according to an embodiment herein. The image capturing device 104 obtains at least one 2D image of the object 102. The 2D images covering 360-degree view of the object 102 at various angles in 3D. The image capturing device 104 captures the 2D image in various angle. In some embodiments, the image capturing device is placed in one or more angles to capture one or more images. In some embodiments, the image capturing device 104 may be a robotic camera device. The object 102 and/or the image capturing device 104 may be moved to capture photos/data of the object 102 from multiple angles. The object 102 is placed in the turntable to rotate the object in the one or more angles. The image capturing device 104 captures the image of the object 102 placed in the turntable 304. The image capturing device is attached in the arm 302 to move the image capturing device 104 in Y axis. The emergency stopper 306 is to stop the capturing of image in wrong angle or the object moves in the turntable 304 or in case of an emergency.

FIG. 3B is an exemplary view of an image capturing system 300 to capture a real-time 2D image in X-axis and Y-axis of FIG. 3A according to an embodiment herein. A turntable 304 may be provided to turn the object 102 in a precise set of angles in X axis. In some embodiments, the turntable 304 holds the object 102 to capture images. The image capturing system 300 includes a moving arm 302 to move the image capturing device 104 in Y axis. In some embodiments, the moving arm 302 holds the image capturing device 104. The turntable 304 rotates in the X-axis and the image capturing device 104 captures the image of the object in X-axis. The moving arm 302 moves the image capturing device in the Y-axis to capture the image of the object in Y-axis. The object alignment module 208 aligns the object 102 on a stencil/mask used for wrapping the image/texture of the object 102 on a pseudo 3D model. The real-time 2D to virtual pseudo 3D conversion and augmented reality display system 106 includes the object alignment module 208 that combines the X axis motion of the object 102 and Y-axis motion of the image capturing device 104 to generate at least one of 3D renders in 360-degree 3D or 3D scans or pseudo 3D scans or images from all angles or 360-degree videos. The real-time 2D to virtual pseudo 3D conversion and augmented reality display system 106 includes the overlaying module 212 that overlays the pseudo 3D 360 degree image set model UV wrap on to another pseudo 3D 360 degree image set model to generate an output pseudo 3D 360 degree image set. In some embodiments, the image capturing device 104/camera includes monocular or stereo camera or 3D scanning camera. In some embodiments, the image capturing device 104 helps to capture the image with plurality of angles of the object to generate the 3D image. In some embodiments, the plurality of angles includes at least one of X-axis, Y-axis, Z-axis. The image capturing system 300 includes a motor 308 that is connected with the moving arm 302 to move the moving arm 302 in upwards and downwards to capture image of the object. The moving arm 302 can be moved up and down around the object using a string which is in turn connected to a motor 310 or using a motor 308 connected to the moving arm 302 directly to control its motion to capture the image of the object in one or more angle. The image capturing device 104 may be triggered wirelessly or using a trigger cable. The image capturing device 104 could be a phone, camera, or 3D camera unit. The system 106 can be controlled either using a phone, laptop or an onboard automated control system which is triggered as and when an object is placed or otherwise either controlled wirelessly or through a wired connection like USB. The system 106 includes a control software that has multiple modes of data capture templates which can be manually selected or can be triggered based on a Machine learning block which detects the lighting settings, photo angles, image capturing device settings like exposure, shutter speed, ISO etc of the system based on the detected object. The system and processing unit can also adjust lights based on the detected product or presets. In another use case, the system 106 is triggered by barcode scans of the product to load a pre-set template for faster scanning. The system 106 can be controlled using a joystick based system by a user for scanning articles in a particular sequence or path or can be done automatically based on presets and templates.

FIG. 4A is an exemplary view of capturing the real time 2D image in a fixed background of FIG. 3A according to an embodiment herein. The capturing of image includes taking one or more 2D images of the object 102 in a fixed background and segmenting the background and object using one or more methods. The one or more methods includes at least one of Machine learning based background elimination or by rule-based background elimination. The images of the object 102 is taken using a camera which helps orient/align the product correctly. The borders of the target object are detected by a method of contrast map or by edge detection algorithms. The edge detection algorithms include at least one of canny or thresholding. The edge detection algorithms find the orientation, skew, and scale to generate realistic outputs.

FIG. 4B is an exemplary view of eliminating the fixed background of the real time 2D image of FIG. 4A according to an embodiment herein. The system 106 includes the 2D image processing module 204 including background elimination section. The background elimination section of the 2D image processing module 204 segments the background from the object 102 and replaces the background of the image with a transparent layer. In some embodiments, the logic for this process can be basic pixel contrast/chroma keying or by segmentation using machine learning.

FIGS. 5A-5B is an exemplary view of wrapping and conversion of the real time 2D image into a 3D object of FIG. 2 according to an embodiment herein. The edges of the background eliminated images are used to capture key features of the images and the shape of the object. The key features of the 2D images and the shape of the object is used to align the object correctly on the stencils/mask used for wrapping the image/texture on a pseudo 3D model as shown. In some embodiments, the pseudo 3D model which is used for this process is created based on each use case/object. The pseudo 3D model is exploded/UV-unwrapped places the flat layout of the object 102 on the UV unwrap of the pseudo 3D model. In some embodiments, if the variations in the image inputs are broad, a physical stencil is used to keep the object in a particular layout/shape for the UV process to capture information which is needed for a proper output. In some embodiments, the output has repeating unit blocks of the image being captured, the system 106 can select a small section of the input image to tile the section on to a complete output.

Figure 6:
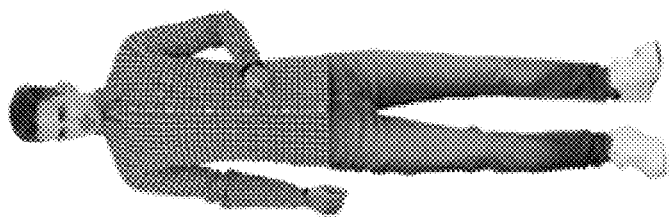
FIG. 6 is an exemplary view of overlaying the converted 3D image over another model of FIG. 1 according to an embodiment herein.

FIG. 6 is an exemplary view of overlaying the converted 3D image over another model of FIG. 1 according to an embodiment herein. The system 106 generates a realistic output of one or more elements in one single image. The one or more elements includes at least one of multi angle view of a product/object or 2D renders of 3D models in various angles. This could also be extended to combination of two or more 3D images or 3D pseudo images. In some embodiments, the parameters of one or more elements include orientation, scale, lighting, and dimensions of the one or more elements in the frame to align elements together to create a realistic output. In some embodiments, the parameters are estimated easily from a 3D model because of the convenience of setting the parameters synthetically. In some embodiments, the parameters are captured from plurality of object using plurality of methods. In some embodiments, the system 106 captures the orientation from inertial position systems in smart phones. In some embodiments, the system 106 captures images through a digitization box with motion control devices. In some embodiments, the system 106 uses historical data and machine learned model of what people generally like, nature of subjects in the images and category of objects in the image to create the realistic output. The parameters are used to estimate the corrections to be done in the elements in the final output. In some embodiments, the correction includes at least one of but not limited to hue, saturation, brightness, contrast, scale, skew, orientation, position, opacity.

| Sl No | Parameter | Description | Estimation Method |
|---|---|---|---|
| 1 | Colour and texture | Colour and texture of the product | Image processing and ML (trained model) based detection |
| 2 | Size information | Understanding key metric dimensions from images | Marker based estimation and smart feature detection of known features like edges, buttons, collars etc |
| 3 | Collection and Soft tagging | Understanding collections and soft features like style, formal/informal etc | ML based trained model |

In a 3D Augmented Reality display of the system 106, the advantages are: 1) a normal 2D picture can be shown on a plane as an AR object, and 2) a device's movement coordinates with respect to this plane can be obtained and used to change the image in said plane. In some embodiments, the 3D Augmented Reality display gives us the advantage of using normal 2D photos as an AR object instead of the complicated process of converting them to 3D and then rendering them. The input for the process of 3D augmented reality display includes one or more images captured using the image capturing device 104. The system 106 is configured to (i) detect a plane where the object needs to be rendered via the normal AR technique, (ii) place image viewer plane facing the device and render "Image 0", (iii) detect user device's (like phone) movement with respect to the plane, calculate the correct image to be displaced based on the angles, and (iv) change the perspective of the plane accordingly and finally change the image on the plane.

Figure 7A:
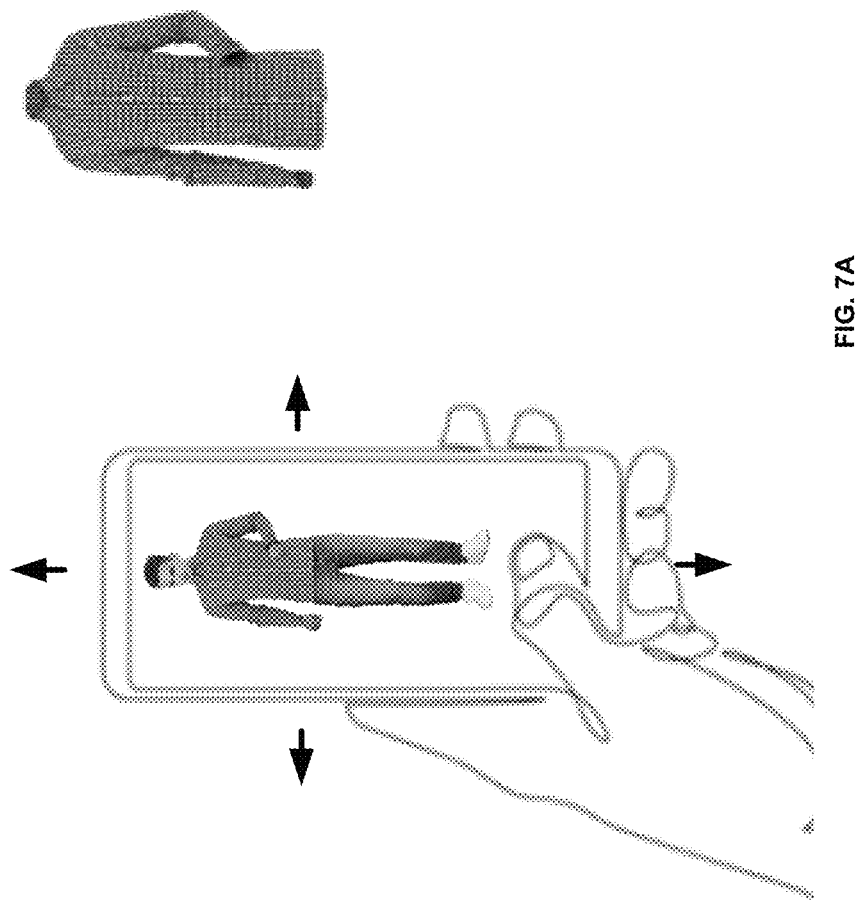
FIGS. 7A, 7B & 7C are exemplary views of capturing a real time 2D image in one or more angles and real time interpolation using the capturing device of FIG. 1 according to an embodiment herein.
Figure 7B:
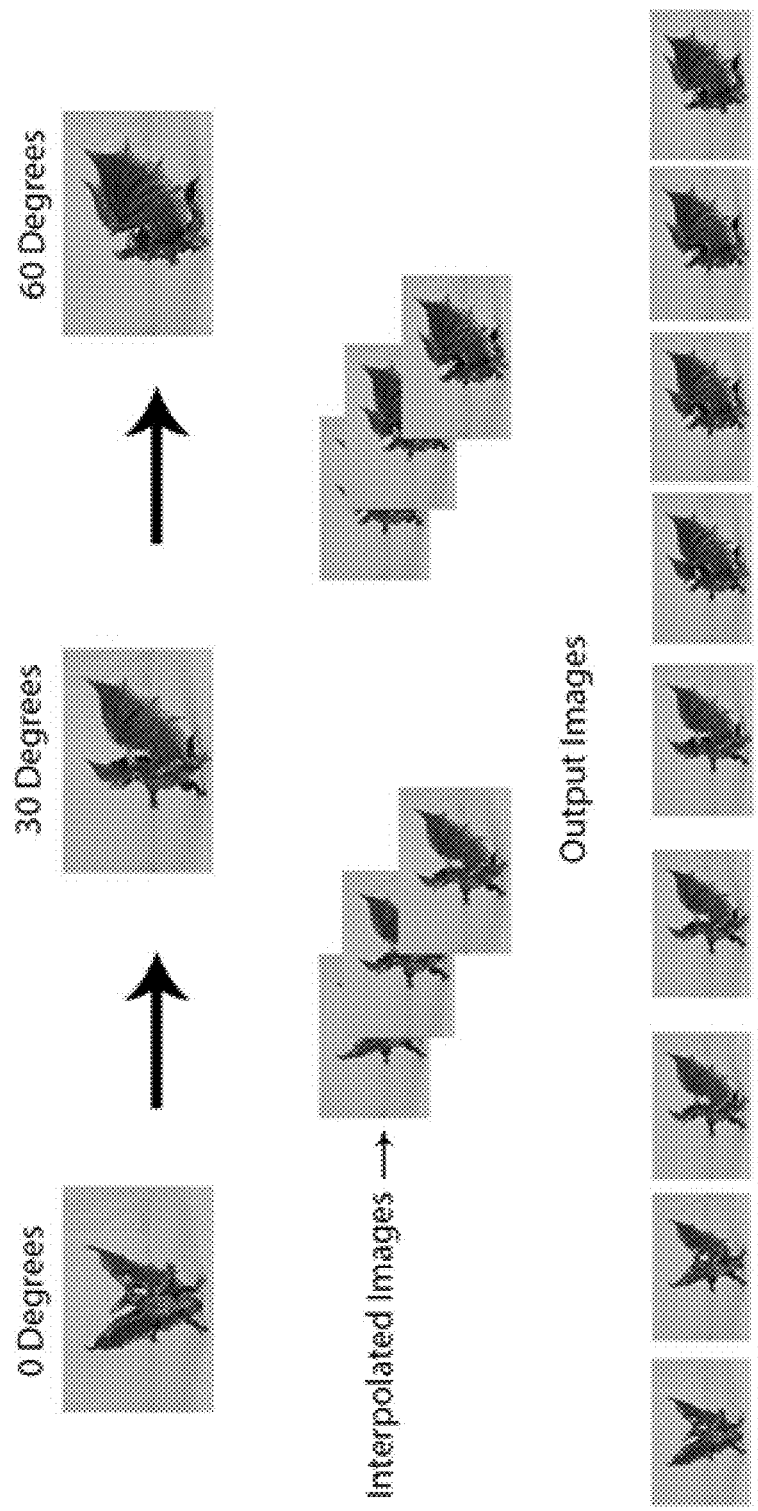
Figure 7C:
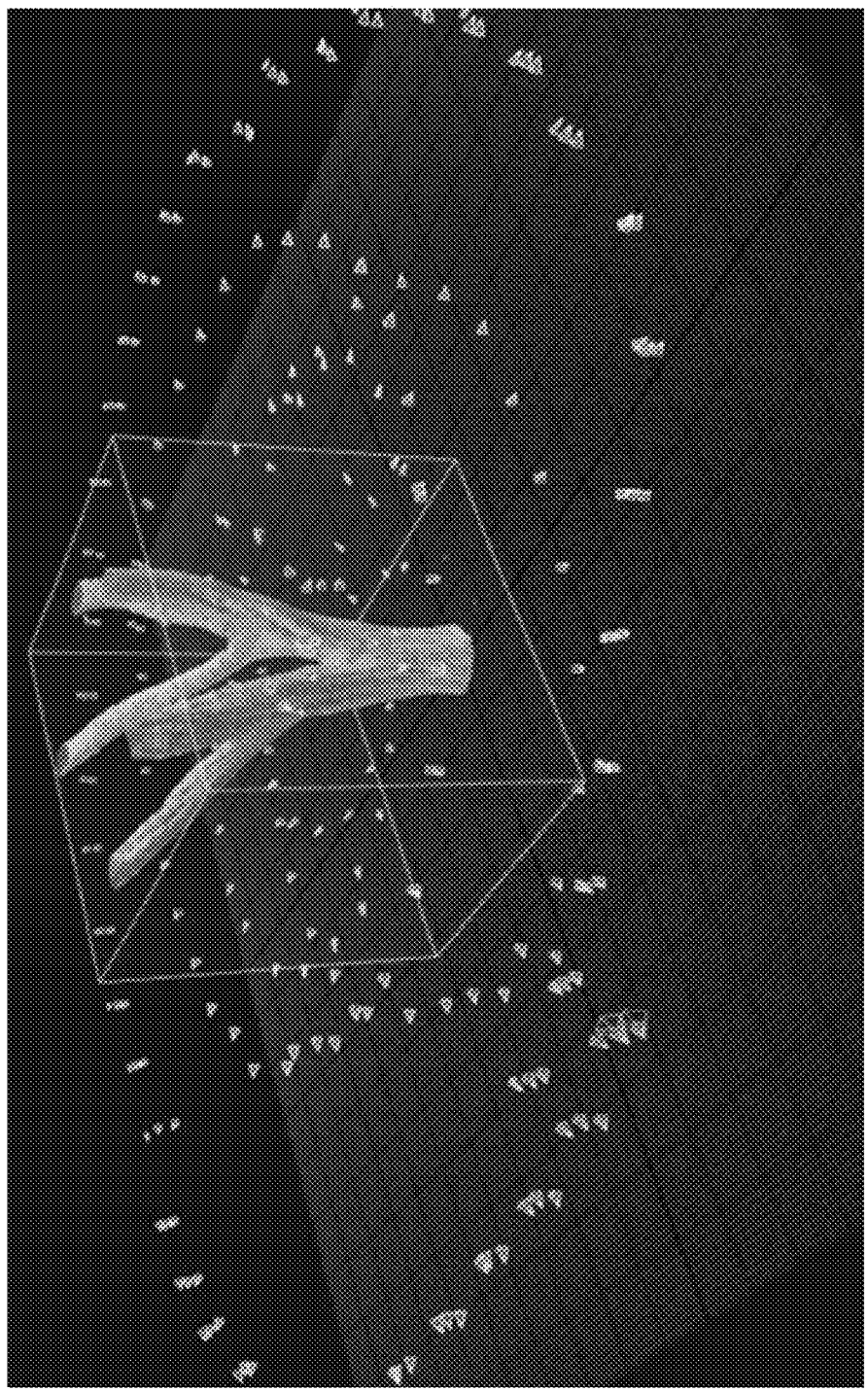

FIGS. 7A, 7B and &7C is an exemplary view of capturing a real time 2D image in one or more angles using the capturing device of FIG. 1 and real time interpolation according to an embodiment herein. In some embodiments, higher the number of images covering the 360 degrees, it is the better for a smooth realistic experience. For example, 36-60 images at a set angle may be needed for a decent viewing experience using 3D augmented reality, while a device is pointed at the object and rotated in 360 degrees to view the object from the 360 degrees using the device interface. The system 106 employs an interpolation technique that is used to artificially increase the number of input images. The interpolation is essentially a technique where given a series of data points, intermediate data point sets can be estimated based on the before and after data. In some example embodiments, the Interpolation technique uses one or more images that are used to calculate plurality of images to use between Image 1 and Image 2. In some example embodiments, to see the effect in the output, the images are created from 20 source images (left) and 60 images where the 40 images are interpolated from the source.

In some example embodiments, the system 106 has a 3D augmented reality display which can provide 3D virtual experience for the user through webpages or mobile apps. In some embodiments, the images are captured from multiple angles of the image. A multiscale approach may be used in captured images to find the location of each image and they are known to be Key images. Using the blocks of the Key neighbouring images, intra-frames are predicted and may be used as an alternative for the complex 3D reconstruction algorithm, and it reduces the difficulty in handling a large number of data points and at the same time all the image processing techniques can be applied to enhance the quality of the final image. The system 106 includes an "Image Fuzzing", involves changing the perspective of starting and ending frames for using them as additional intermediate frames. In some example embodiments, if we need to go from image 30 (30-degree rotation) and image 35 (35 degree rotation). In some embodiments, change perspective of image 30 by 1 degree in the +ve direction to generate image 31.

In some example embodiments, the system employs a well-trained Deep Learning (DL) network to extract features like Image saliency, Angle of the photograph, Lighting Details, Type of product and colour scheme. In some embodiments, the key element/feature (product) is identified in the photograph/image using the saliency features to separate the object from the background. In some example embodiments, the angle of the photograph is determined. In some embodiments, lighting details are used to process the image to make the product image appear real. In some embodiments, a type of product is identified to recognize the background texture that is to be used for a lifestyle photograph. In some embodiments, colouring schemes find out a hue saturation level of the original image that has to adjust at the time of post-production work.

In some example embodiments, a first set of images or a video around the object is used to generate a set of images which can be combined with a second set of images or videos captured from the user's devices like phones or the image capturing system 300 of FIG. 3 to generate a combination of images to generate combination object 3D pseudo images. With image editing options like colour correction and scaling, there could additional user engagements like checking fit in three dimensions, a look and feel of objects in 3D trial rooms and web interfaces or mobile application interfaces either using Augmented reality or through a purely virtual user engagement.

Figure 8A:
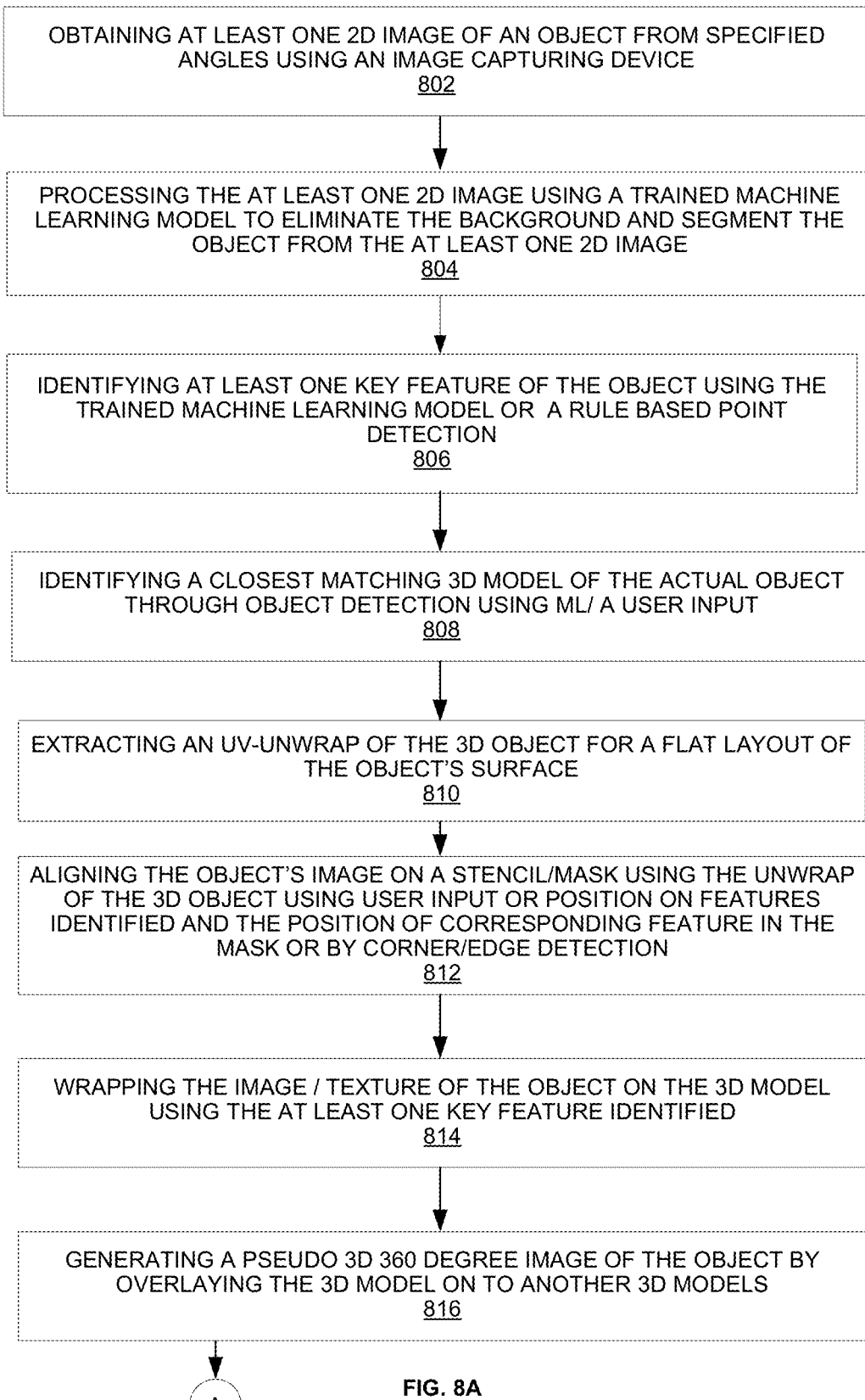
FIGS. 8A & 8B are flow diagrams that illustrates a method of generating pseudo 3D image data set of an object through 2D image based digitization and displaying them using augmented reality display using 2D to virtual pseudo 3D conversion and augmented reality display system of FIG. 1 according to an embodiment herein.
Figure 8B:
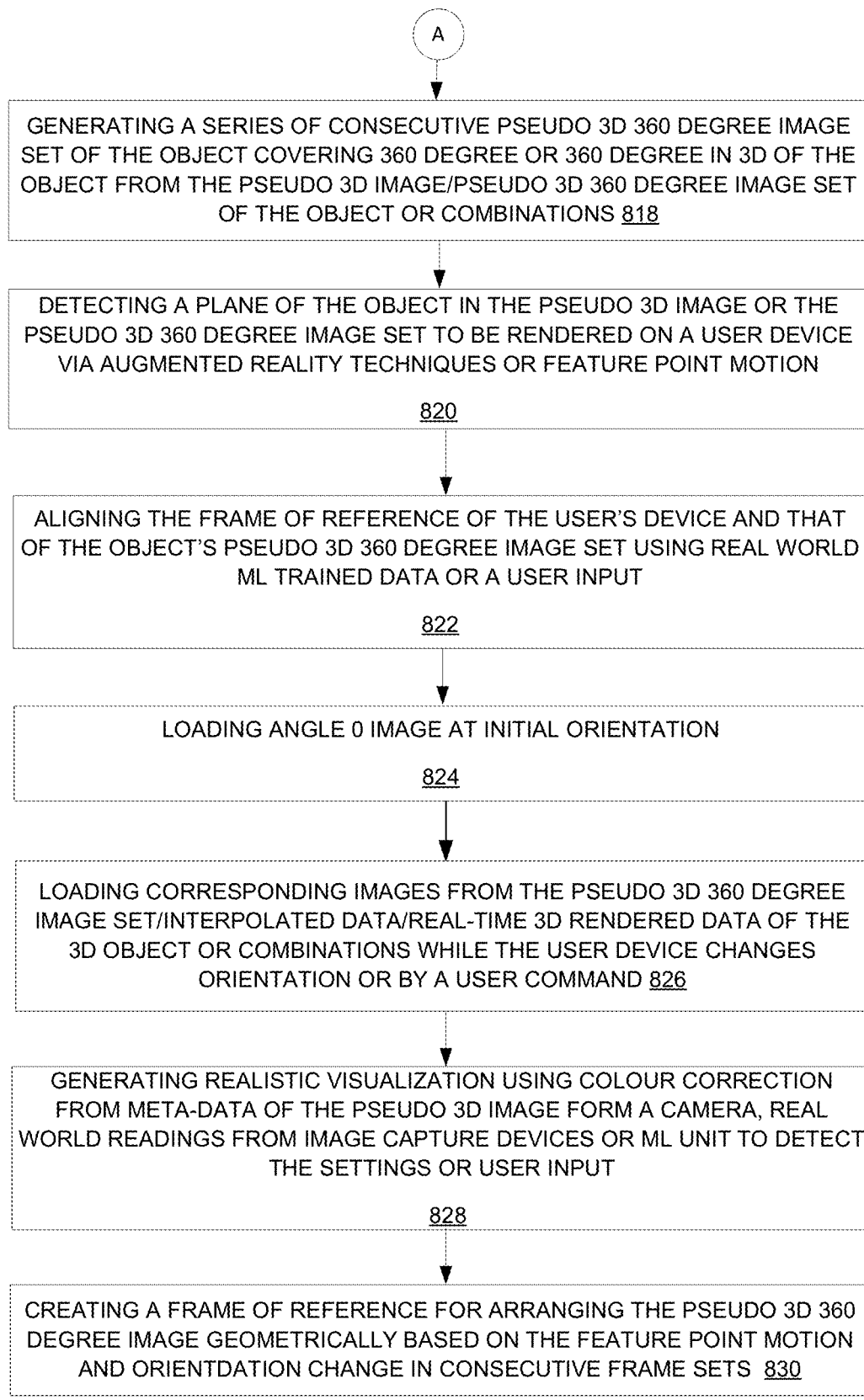

FIG. 8A and FIG. 8B are flow diagrams that illustrates a method of generating pseudo 3D image data of an object through 2D image based digitization and displaying them using augmented reality display using the 2D to virtual pseudo 3D conversion and augmented reality display system of FIG. 1 according to an embodiment herein. At step 802, at least one 2D image of an object is obtained from specified angles using an image capturing device. At step 804, the at least one 2D image is processed using a trained machine learning model to eliminate the background and segment the object from the at least one 2D image. The at least one 2D image of the object captured from the multiple angles are rendered for generating a pseudo 3D image set/model based on pseudo 3D image data generated for the object to be displayed based on at least one angle of view of a user device. At step 806, at least one key feature of the object is identified using the trained machine learning model or a rule based point detection. The at least one key feature of the object are processed for accurate alignment and for generating asset combination by overlaying the pseudo 3D model on to another pseudo 3D model. At step 808, a closest matching 3D model of the actual object is identified through object detection using a Machine learning (ML)/a user input. At step 810, the bidimensional/UV-unwrap of the 3D object is extracted for a flat layout of the object's surface. At step 812, the object's image on a stencil/mask is aligned using the unwrap of the 3D object using a user input or skew, translation and rotation based on position on the features identified and the position of corresponding feature in the mask or by corner/edge detection. At step 814, the image/texture of the object on the 3D model is wrapped using the at least one key feature identified. At step 816, the pseudo 3D model is overlayed on to another 3D model/s to generate a final/pseudo 3D 360 degree image set of the object. At step 818, a series of consecutive pseudo 3D 360 degree image set of the object covering 360 degree or 360 degree in 3D of the object is generated from the pseudo 3D image/pseudo 3D 360 degree image set of the object or combinations. At step 820, a plane of the object in the pseudo 3D image or the pseudo 3D 360 degree image set to be rendered on a user device via augmented reality techniques or feature point motion. At step 822, a frame of reference of the user's device is aligned and that of the object's pseudo 3D 360 degree image set using real world ML trained data or a user input. At step 824, angle θ image is loaded at initial orientation. At step 826, corresponding images from pseudo 3D 360 degree image set/interpolated data/real-time 3D rendered data of the 3D object or combinations is loaded while the user device changes orientation or by a user command. At step 828, realistic visualization/output using colour correction is generated from meta-data of the pseudo 3S image form a camera, real world readings from image capturing devices or ML unit to detect the settings or user input. At step 830, a frame of reference for arranging the pseudo 3D 360 degree image geometrically is created based on the feature point motion and orientation change in consecutive frame sets to combine 2 or more sets of pseudo 3D 360 degree image sets by scaling, skewing and rotation and then aligns them based on feature alignment, pre-sets or user inputs to generate an output pseudo 3D 360 degree image set that is compatible with augmented reality.

The method includes generating a virtual pseudo 3D 360 degree image set of the object to be displayed based on at least one angle of view by detecting movement coordinates of the user device with respect to the pseudo 3D 360 degree image set's viewer plane. The method further includes modifying a perspective of the image viewer plane to change the virtual pseudo 3D 360 degree image set of the object on the image viewer plane by performing an interpolation between at least two consecutive virtual pseudo 3D 360 degree images according to the movement coordinates of the user device in real time, and providing the virtual pseudo 3D 360 degree image set of the object on the image viewer plane as an augmented reality object in real-time on the user device, wherein the augmented reality object is overlayed on a camera feed of the user device.

In some embodiments, the object from the 2D image is segmented by rule-based background elimination. In some embodiments, the 2D image of the object is taken by a jig which helps to orient/align the object. In some embodiments, the borders of the object are detected by a method of contrast map. In some embodiments, the borders of the object are detected by edge detection algorithms including canny algorithm or thresholding algorithm. In some embodiments, key points are identified to find the orientation, skew, and scale to generate realistic outputs. In some embodiments, the background of the 2D image is replaced with a transparent layer by basic pixel contrast or chroma keying. The edges of the BG eliminated images are used to capture key features and shape of the object that is used to align the subject correctly on the stencils/mask used for wrapping the image/texture on a pseudo 3D model. The pseudo 3D model is created based on each use case/object. The pseudo 3D model is exploded/UV-unwrapped of the pseudo 3D model and places the flat layout of the object 102 on the UV unwrap of the pseudo 3D model. In some embodiments, a physical stencil is used to keep the object in a particular layout/shape for the UV unwrapping to capture information if the variations in the image inputs are broad. In some embodiments, if the output has repeating unit blocks of the image being captured, the system 106 can select a small section of the input image to tile the section on to the complete output. In some embodiments, other versions of a digitised object can be created manually by changing at least one of colour, dimensions etc.

In some embodiments, the pseudo 3D 360 degree image or output can be integrated into platforms like Metaverse and oculus rift devices etc. using APIs to create combinations of the pseudo 3D 360 degree images of the objects for realistic VR environments and experiences at lower costs of content generation. The method further detects an augmented reality plane detection and asset display like Superplane or RANSAC and may combine standard 3D assets with the pseudo 3D 360 degree image sets of the object.

In some embodiments, the image processing and trained machine learning model base detection is used to detect colour and texture of the product. In some embodiments, the detection of the key metric dimensions from images is performed based on at least one of Marker based estimation and smart feature detection of known features. In some embodiments, the known features include but not limited to edges, buttons, collars. In some embodiments, the trained machine learning model is used to understand collections and soft features. In some embodiments, the soft features include at least one of but not limited to style, formal or informal.

In some embodiments, the UV unwrapped 3D model may be over laid on to another pseudo model to generate a realistic output of multiple elements in one single 3D image. The multiple elements include at least one of multi angle view of a product, 2D renders of 3D models in various angles. The parameters of the multiple elements include at least one of orientation, scale, lighting, and dimensions that are estimated from a 3D model. In some embodiments, setting the multiple elements synthetically in the frame to align elements together to create a realistic output. In some embodiments, the parameters are captured from other image by other methods, including at least one of capturing the orientation from inertial position systems in smart phones, capturing images through a digitization box with motion control device, historical data and machine learned model of what people generally like, nature of subjects in the images and category of subjects in the image. The parameters are used to estimate the corrections to be done in the elements in the final output, which includes at least one of Hue, Saturation, Brightness, Contrast, Scale, Skew, Orientation, Position, Opacity etc. Interpolation is used to increase the number of input images. Intermediate data point sets are estimated based on before and after data in given a series of data points in interpolation. For example, If Image 1, Image 2, . . . Image 20 are available, the interpolation technique is used to calculate Image 1.2, Image 1.4, Image 1.6, Image 1.8 etc using spatial parameters associated between Image 1 and Image 2. In some embodiments, the perspective of starting and ending frames of the 3D image is changed for using them as additional intermediate frames. For example, if we need to go from Image 30 (30 degree rotation) and Image 35 (35 degree rotation), the following additional frames are added. Accordingly, the perspective of Image 30 is changed by 1 degree in the +ve direction to generate Image 31. The perspective of Image 35 is changed by 1 degree in the −ve direction to generate Image 34. The image jump sequence is Image 30, Image 31, Image 32, Image 33, Image 34, Image 35.

The machine learning model may be trained using various parameters of the object taken at one or more instances to create a realistic output. The parameters include at least one of colour and texture of the object, key metric dimensions of the object including size information, formal/informal styles, nature, and category of object. The captured photos may be displayed as a pseudo 3D model in the 3D Augmented Reality display. The traditional way devices render Augmented Reality (AR) objects is in the device's native format (example the USDZ format for Apple devices) which are converted from 3D objects (example object format). The 3D Augmented Reality display according to the method takes advantage of two facts (i.e.) a normal 2D picture set can be shown on a plane as an AR object and the device's movement coordinates with respect to this plane can be obtained and used to change the image in said plane. This method gives the advantage of using normal 2D photos as an AR object instead of the complicated process of converting them to 3D and then rendering them. The method includes the step of detecting a plane where the object needs to be rendered via the AR method. In some embodiments, detecting the plane by placing of image viewer plane facing the device and render "Image 0". Detecting phone movement with respect to the plane and calculate the correct image to be displaced based on the angles. Changing the perspective of the plane accordingly and finally change the image on the plane.

The traditional 3D objects have scale as their metadata, this needs to separately accounted for when displaying 2D images. The solution may be to have an external system hold this information for later use. Number of images needed for a realistic experience and smooth image transitions are necessary to generate realistic augmented reality experience for the user. For a smooth realistic experience, more number of images in total covering the 360 degrees are required. In some embodiments, a decent viewing experience of 36-60 images at a set angle are needed in this method. In some embodiments, no need of multiple image inputs to have high number of images.

In some embodiments, a technique called interpolation is employed to artificially increase the number of input images. In some embodiments, the interpolation is essentially a technique where given a series of data points, intermediate data point sets can be estimated based on the before and after data. In some example embodiments, if there are images Img1, Img2, Image 20, the Interpolation technique calculates Img1.2, Img1.4, Img1.6, Img1.8 etc to use between Img1 and Img2.

The real-time 2D to 3D conversion and augmented reality display system 106 is used for digitization of products for cataloguing both for online as well as offline customers. The system 106 saves both time, cost, and efficiency of generating quality images for products. Time consuming process of generating manual tags and content can be eliminated using the system 106 by training a machine learning model to detect the features from images and content generation. The method provides 3D virtual experience for the user through webpages or mobile apps. According to the method, images are taken around the object from multiple levels. From these images, a multiscale approach is used to find the location of each images known to be key neighbouring images. Using blocks of these key neighbouring images, intra-frames are predicted. This technique is used as an alternative for the complex 3D reconstruction algorithm, and it reduces the difficulty in handling a large number of data points and at the same time all the image processing techniques can be applied to enhance the quality of the final image.

Figure 9A:
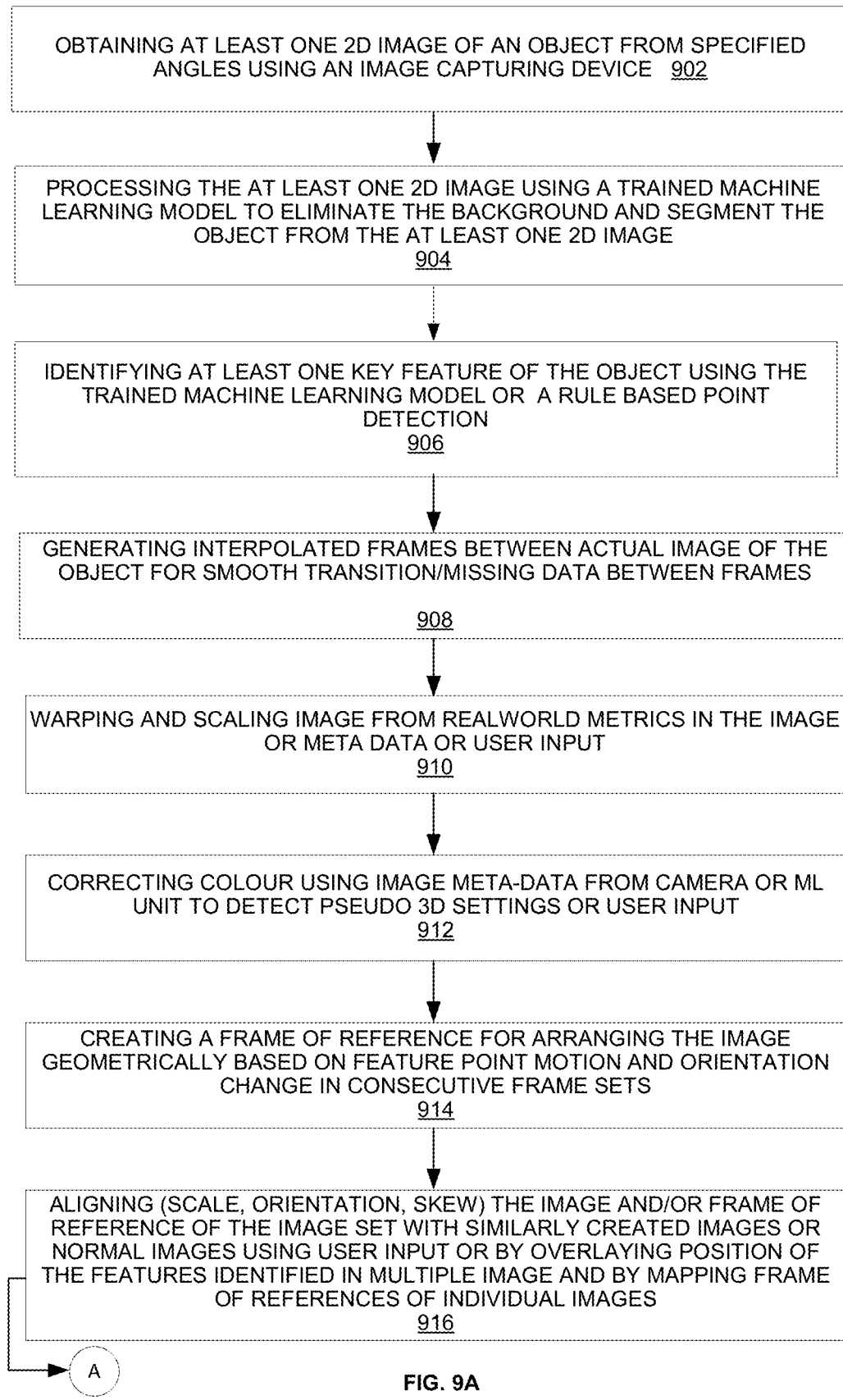
FIGS. 9A-9C are flow diagrams that illustrates a method of generating a pseudo 3D image data of an object using 3D UV wrap technique from images of an object and displaying them in augmented reality display using the 2D to virtual pseudo 3D conversion and augmented reality display system of FIG. 1 according to an embodiment herein.
Figure 9B:
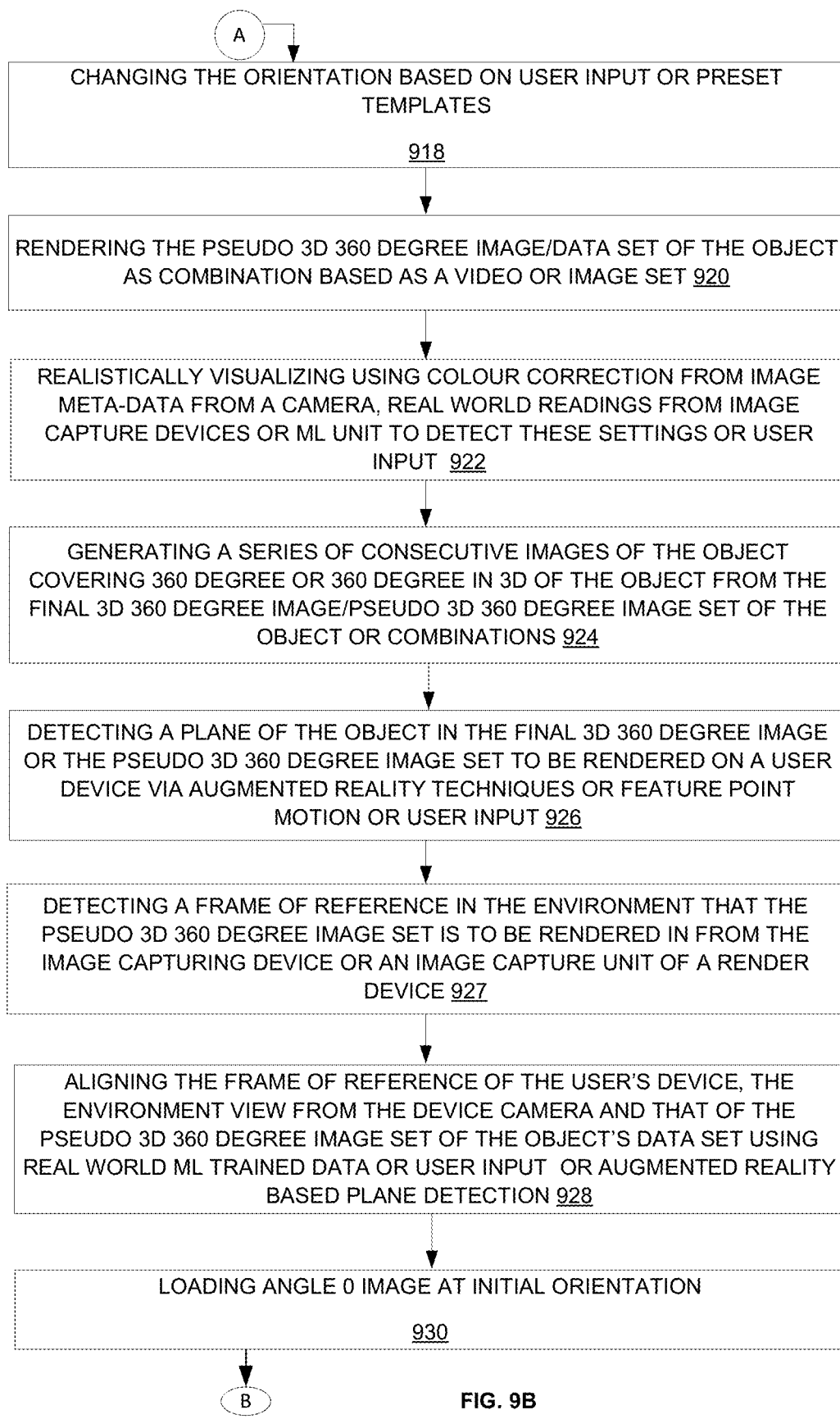
Figure 9C:
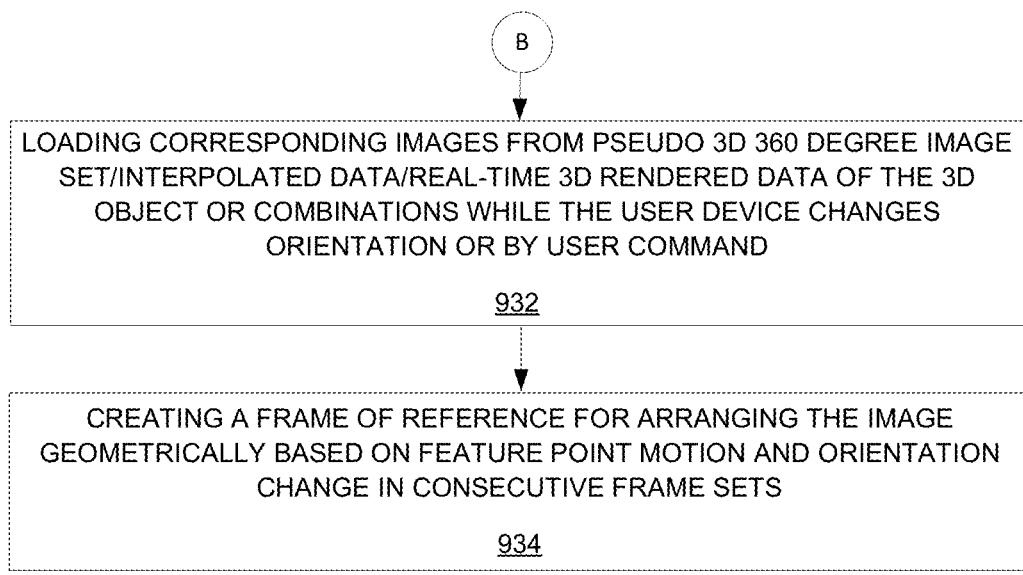

FIGS. 9A-9C are flow diagrams that illustrates a method of generating a pseudo 3D image data of an object using 3D UV wrap technique from images of an object and displaying them in augmented reality display using the 2D to virtual pseudo 3D conversion and augmented reality display system of FIG. 1 according to an embodiment herein. At step 902, at least one 2D image of an object from specified angles is obtained using an image capturing device. At step 904, the at least one 2D image is processed using a trained machine learning model to eliminate the background and segment the object from the at least one 2D image. At step 906, at least one key feature of the object is identified using the trained machine learning model or a rule-based point detection. At step 908, interpolated frames are generated between actual image frames of the object for smooth transition/missing data between frames. At step 910, image from real-world metrics in the image or meta data or user input is warped and scaled. At step 912, correcting colour using image meta-data form a camera or Machine learning (ML) unit to detect pseudo 3D settings or user input. At step 914, a frame of reference for arranging the image geometrically is created based on feature point motion and orientation change in consecutive frame sets. At step 916, aligning (scale, orientation, skew) the image and/or frame of reference of the image set with similarly created images or normal images using user input or by overlaying position of the features identified in multiple images and by mapping frame of references of individual images. At step 918, the orientation is changed based on user input or pre-set templates. At step 920, the pseudo 3D 360 degree image/data set of the object is rendered as combination based as a video or image set. At step 922, realistically visualizing, using colour correction from image meta-data form a camera, real world readings from image capturing devices, or ML unit to detect these settings, or user input. At step 924, a series of consecutive images of the object covering 360 degree or 360 degrees in 3D of the object is generated from the final 3D 360 degree image/pseudo 3D 360 degree image set of the object or combinations. At step 926, a plane of the object in the final 3D 360 degree image or the pseudo 3D 360 degree image to be rendered on a user device is detected set via. augmented reality techniques or feature point motion or user input. At step 927, a frame of reference in the environment that the pseudo 3D 360 degree image set is to be rendered in from the image capturing device or an image capture unit or a render device. At step 928, the frame of reference of the user's device, the environment view from the device camera and that of the pseudo 3D 360 degree image set of the object's data set is aligned using real world ml trained data or user input or augmented reality based plane detection. At step 930, angle θ image is loaded at initial orientation. At step 932, corresponding images from pseudo 3D 360 degree image set/interpolated data/real-time 3D rendered data of the 3D object or combinations is loaded while user device changes orientation or by user command. At step 934, a frame of reference for arranging the image geometrically is created based on feature point motion and orientation change in consecutive frame sets.

Figure 10:
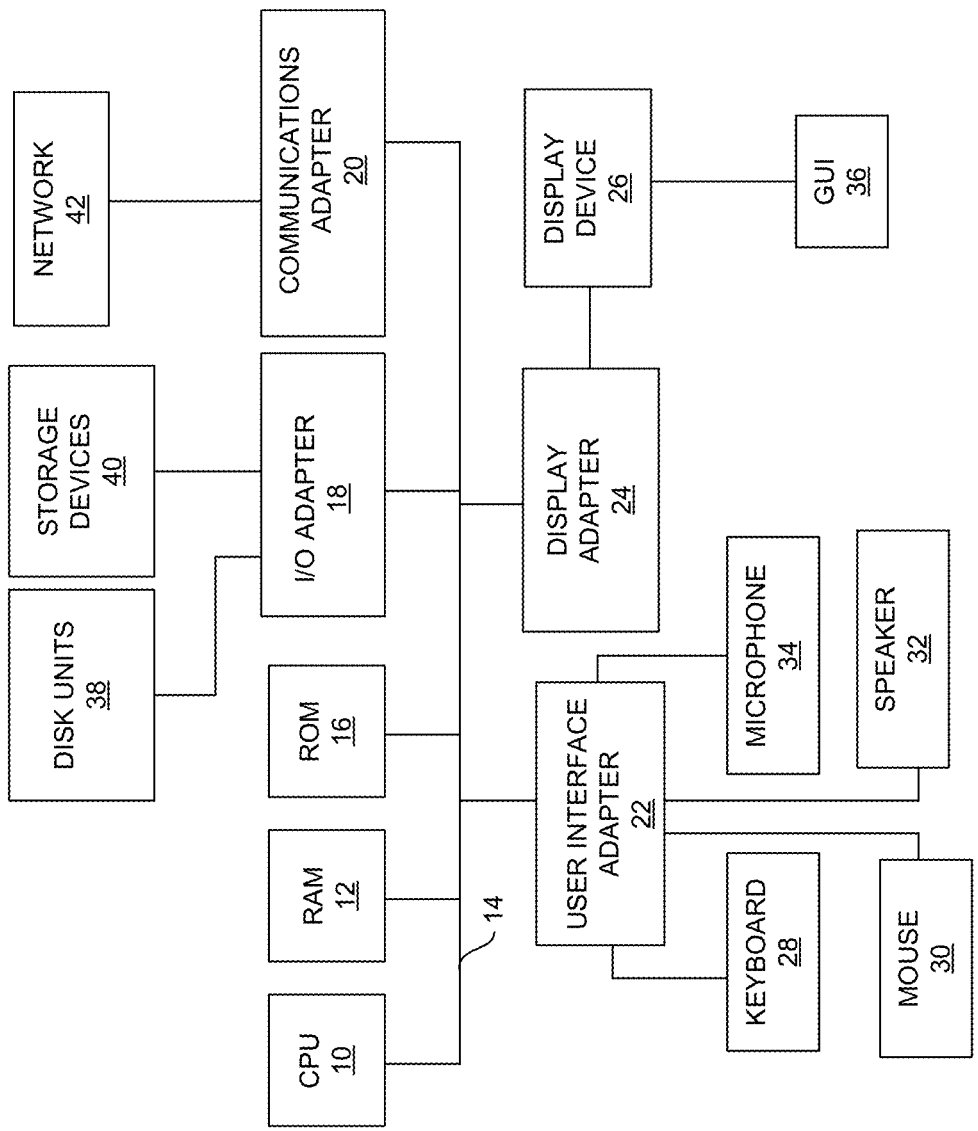
FIG. 10 is a schematic diagram of a computer architecture in accordance with the embodiments herein.

FIG. 10 illustrates a representative hardware environment for practicing the embodiments herein. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a subject interface adapter 19 that connects a predetermined board 15, mouse 17, speaker 24, microphone 22, and/or other subject interface devices such as a touch screen device (not shown) or a remote control to the bus 12 to gather subject input. Additionally, a communication adapter 20 connects the bus 12 to a data processing network 25, and a display adapter 21 connects the bus 12 to a display device 23 which may be embodied as an output device such as a monitor, printer, or transmitter, for example.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In some embodiments, the Machine learning data of products are used to create an ecommerce store or catalogue using Machine Learning from Video of multiple products placed together or in shelves by understanding products and genres of store/catalogue by understanding product sets/categories.

In some example embodiments, if in a fashion store, the plurality of products of user may be placed together and take a video. In some embodiments, the system will understand products and also understand that it is a collection with say . . . ethnic fashion products and create a catalogue and webstore for ethnic fashion products and list the products there accordingly.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

In another embodiment, the set of images can be used to generate 3D stereo scope vision for image display for immersive display and for experiential walkthroughs using augmented reality. This could be used for archiving and cataloguing of products and objects for various use cases along with automated feature and meta data extraction for archaeological, forensic, education and medical artefact and sample monitoring as well as artefact merging and visualization of combinations of artefacts and/or objects Input/output (I/O) devices (including but not limited to predetermined boards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope.

I claim:

1. A system for generating a real-time pseudo 3-dimensional (3D) augmented reality image of an object from a 2-dimensional (2D) image of the object, comprising:
a processor and a user device communicatively connected to the processor, wherein the processor is configured to
process at least one 2-dimensional (2D) image of an object using a trained machine learning model or a rule-based model to eliminate the background of the object and segment the object from the at least one 2D image, wherein the machine learning model analyses the at least one 2D image on a pixel by pixel basis to segment the object from the at least one 2D image, wherein the pixels that are not associated with the object in the at least one 2D image are determined as background and eliminated by converting into a transparent pixel, wherein the rule-based model processes the at least one 2D image of the object by (i) detecting edges of the object using an edge detection algorithm with in the at least one 2-dimensional (2D) image of the object, and (ii) applying a thresholding algorithm to the edge-detected image to segment the detected edge from the background based on colour and location and (iii) replacing the background of the at least one 2-dimensional (2D) image with a transparent layer, wherein the at least one 2D image is captured using a camera or an image capturing device from at least one angle of view;
identify at least one key feature and shape of the object in the processed image using a trained machine learning model to align the object image on a stencil/mask used for wrapping the image/texture of the object on a 3D model, wherein the at least one key feature comprises edges, colour, patterns, texture and markers of the object in the at least one 2D image;
perform bidimensional/UV unwrapping of the 3D model by (i) placing a flat layout of a surface of the object on the UV unwrap of the 3D model, (ii) wrapping the UV on the 3D model, and (iii) generating a pseudo 3D image, wherein the pseudo 3D image is generated for a combination of objects by aligning multiple sets of 2D images together;
generate a set of consecutive pseudo 3D 360 degree image set of the object based on the generated pseudo 3D image of the object using a frame interpolation techniques that creates new frames between existing frames in a sequence;
detect movement coordinates of the user device with respect to an image viewer plane using at least one of a change in a camera plane or an inertial measurement unit (IMU) input;
determine the pseudo 3D 360 degree images to be displayed on the user device by performing real-time interpolation between at least two consecutive pseudo 3D 360 degree images from the pseudo 3D 360 degree image set according to the movement coordinates of the user device, wherein the real-time interpolation provides the pseudo 3D 360 degree image that matches with the 3D image viewed from the at least one angle of view on the user device;
performing colour correction of the pseudo 3D 360 degree image set to render a realistic visualization of the pseudo 3D 360 object in a current environment by analysing metadata of the at least one 2D image and parameters of the current environment, wherein the metadata is captured during original scanning of the object using the camera or the image capturing device; and
provide subsequent pseudo 3D 360 degree images of the object on the image viewer plane as an augmented reality object in real-time on the user device with respect to the change of the at least one angle of view of the user device from the pseudo 3D 360 image set of the object, wherein the augmented reality object is overlaid on a camera feed or wearable device display of the user device as an interactive object or element.

2. The system as claimed in claim 1, wherein the processor modifies a perspective of the image viewer plane to change the pseudo 3D 360 degree image set of the object on the image viewer plane by performing the interpolation between at least two consecutive pseudo 3D 360 degree images according to the movement coordinates of the user device in real time, wherein the augmented reality object is overlayed on a camera feed of the user device.

3. The system as claimed in claim 1, wherein the system generates the pseudo 3D 360 degree image set of the object by
(i) identifying the at least one key feature of the object using the trained machine learning model or a rule based points detection,
(ii) identifying a closest matching 3D model of the object through object detection using the machine learning model or a third user input,
(iii) extracting an unwrap of the detected 3D object for a flat layout of a surface of the object,
(iv) aligning the UV unwrap image of the 3D object on a stencil or a mask using the unwrap of the 3D object using a fourth user input or skew, translation and rotation based on position on features identified and the position of corresponding feature in the mask or by corner/edge detection, and
(v) wrapping the image of the 3D model on the object in 3D Augmented Reality view using the at least one key feature identified.

4. The system as claimed in claim 1, wherein the at least one 2-dimensional image of the object is captured using the image capturing device from a first angle, wherein the image capturing device is communicatively connected to the system, wherein the image capturing device captures the at least one 2D image covering 360 degrees view of the object at various angles.

5. The system as claimed in claim 1, wherein the system places the image viewer plane that faces the user device rendering the pseudo 3D 360 degree image of the object.

6. The system as claimed in claim 1, wherein the object comprises a product of interest to a user in a physical retail store environment, a digital retail store environment, a virtual reality store environment, a social media environment or a web page environment.

7. The system as claimed in claim 1, wherein the user device comprises a camera that implements a real-time consistent plane detection technique to display the pseudo 3D 360 degree image set of the object in augmented reality.

8. The system as claimed in claim 1, wherein the system determines coordinates of the object plane with respect to the user device at the pseudo 3D 360 degree image or 2D image of the object.

9. The system as claimed in claim 1, wherein the machine learning model employs a machine learning technique that is designed to recognize and interpret training data through at least one of a machine perception, a labelling and clustering raw data, wherein the machine learning model is trained to interpret the raw data by providing a collection of historical data as an input.

10. The system as claimed in claim 1, wherein the machine learning model is trained using one or more parameters of the object taken at one or more instances, wherein the parameters comprises at least one of a colour and a texture of the object, key metric dimensions of the object comprising size information, formal or informal styles if the object is an item of clothing, a nature and, a category of the object and a textual, brand, nature region of interest or iconographic data of the object.

11. A processor-implemented method for generating a real-time pseudo 3-dimensional (3D) augmented reality image of an object from a 2-dimensional (2D) image of the object using an augmented reality display system, the method comprising:

processing at least one 2-dimensional (2D) image of an object using a trained machine learning model or a rule-based model to eliminate the background of the object and segment the object from the at least one 2D image, wherein the machine learning model analyses the at least one 2D image on a pixel by pixel basis to segment the object from the at least one 2D image, wherein the pixels that are not associated with the object in the at least one 2D image are determined as background and eliminated by converting into a transparent pixel, wherein the rule-based model processes the at least one 2D image of the object by (i) detecting edges of the object using an edge detection algorithm with in the at least one 2-dimensional (2D) image of the object, and (ii) applying a thresholding algorithm to the edge-detected image to segment the detected edge from the background based on colour and location, and (iii) replacing the background of the 2-dimensional (2D) images with a transparent layer, wherein the at least one 2D image are captured using a camera or an image capturing device from at least one angle of view;

identifying at least one key feature and shape of the object in the processed image using a trained machine learning model to align the object image on a stencil/mask used for wrapping the image/texture of the object on a 3D model, wherein the at least one key feature comprises edges, colour, patterns, texture and markers of the object in the at least one 2D image;

performing bidimensional/UV unwrapping of the 3D model by (i) placing a flat layout of a surface of the object on the UV unwrap of the 3D model, (ii) wrapping the UV on the 3D model, and (iii) generating a pseudo 3D image, wherein the pseudo 3D image is generated for a combination of objects by aligning multiple sets of 2D images together;

generating a set of consecutive pseudo 3D 360 degree image set of the object based on the generated pseudo 3D image of the object using a frame interpolation techniques that creates new frames between existing frames in a sequence;

detecting movement coordinates of the user device with respect to an image viewer plane using at least one of a change in a camera plane or an inertial measurement unit (IMU) input;

determining the pseudo 3D 360 degree images to be displayed on the user device by performing real-time interpolation between at least two consecutive pseudo 3D 360 degree images from the pseudo 3D 360 degree image set according to the movement coordinates of the user device, wherein the real-time interpolation provides the pseudo 3D 360 degree image that matches with the 3D image viewed from the at least one angle of view on the user device;

performing colour correction of the pseudo 3D 360 degree image set to render a realistic visualization of the pseudo 3D 360 object in a current environment by analysing metadata of the at least one 2D image and parameters of the current environment, wherein the metadata is captured during original scanning of the object using the camera or the image capturing device; and providing subsequent pseudo 3D 360 degree images of the object on the image viewer plane as an augmented reality object in real-time on the user device with respect to the change of the at least one angle of view of the user device from the pseudo 3D 360 image set of the object, wherein the augmented reality object is overlaid on a camera feed or wearable device display of the user device as an interactive object or element.

* * * * *